(12) United States Patent
Yi et al.

(10) Patent No.: US 10,773,716 B2
(45) Date of Patent: Sep. 15, 2020

(54) VEHICLE DRIVING CONTROL APPARATUS AND METHOD

(71) Applicant: LG Electronics Inc., Seoul (KR)

(72) Inventors: Chuho Yi, Seoul (KR); Youngwoo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/808,789

(22) Filed: Nov. 9, 2017

(65) Prior Publication Data
US 2018/0134286 A1    May 17, 2018

(30) Foreign Application Priority Data

Nov. 11, 2016   (KR) .......................... 10-2016-0150556

(51) Int. Cl.
*B60W 30/09* (2012.01)
*G08G 1/16* (2006.01)
(Continued)

(52) U.S. Cl.
CPC ............ *B60W 30/09* (2013.01); *B60W 10/04* (2013.01); *B60W 10/18* (2013.01); *B60W 10/20* (2013.01); *B60W 30/12* (2013.01); *B60W 30/143* (2013.01); *B60W 30/16* (2013.01); *B60W 30/18145* (2013.01); *B60W 30/18154* (2013.01); *G05D 1/0214* (2013.01);
(Continued)

(58) Field of Classification Search
USPC .......................................................... 701/41
See application file for complete search history.

(56) References Cited

U.S. PATENT DOCUMENTS 6,364,433 B1    4/2002  Stemer
8,195,394 B1 *  6/2012  Zhu ........................ G01C 21/26
                                                                  382/107
(Continued)

FOREIGN PATENT DOCUMENTS

DE    102011108870    4/2012
DE    102012107188    2/2014
(Continued)

OTHER PUBLICATIONS

Extended European Search Report in European Application No. 17001512.7, dated Jan. 8, 2018, 10 pages.

*Primary Examiner* — Lail A Kleinman
*Assistant Examiner* — Mahmoud M Kazimi
(74) *Attorney, Agent, or Firm* — Fish & Richardson P.C.

(57) ABSTRACT

A vehicle driving control apparatus includes an object detection unit configured to detect an object located outside a vehicle; and at least one processor configured to provide a first control signal and a second control signal based on information regarding the object detected by the object detection unit. The at least one processor provides the first control signal and the second control signal by: based on the information regarding the object, providing the first control signal to cause one of an increase or a decrease in a speed of the vehicle during a first time period; and based on the information regarding the object and based on the first control signal provided during the first time period, providing the second control signal to cause the other of the increase or the decrease in the speed of the vehicle during a second time period.

20 Claims, 23 Drawing Sheets

(51) Int. Cl.

| | | |
|---|---|---|
| *G05D 1/02* | (2020.01) | |
| *B60W 30/18* | (2012.01) | |
| *B60W 30/16* | (2020.01) | |
| *B60W 30/14* | (2006.01) | |
| *B60W 30/12* | (2020.01) | |
| *B60W 10/20* | (2006.01) | |
| *B60W 10/18* | (2012.01) | |
| *B60W 10/04* | (2006.01) | |
| *B60W 30/095* | (2012.01) | |

(52) U.S. Cl.
CPC .......... *G05D 1/0223* (2013.01); *G08G 1/163* (2013.01); *G08G 1/166* (2013.01); *G08G 1/167* (2013.01); *B60W 2552/15* (2020.02); *B60W 2552/30* (2020.02); *B60W 2554/00* (2020.02); *B60W 2554/80* (2020.02); *B60W 2555/60* (2020.02); *B60W 2710/09* (2013.01); *B60W 2710/18* (2013.01); *B60W 2710/20* (2013.01); *B60W 2720/10* (2013.01); *G05D 2201/0213* (2013.01)

(56) References Cited

U.S. PATENT DOCUMENTS

| | | | |
|---|---|---|---|
| 8,930,060 B1 | 1/2015 | Lu et al. | |
| 2001/0007966 A1 | 7/2001 | Sielagoski et al. | |
| 2005/0240334 A1 | 10/2005 | Matsumoto et al. | |
| 2007/0005218 A1* | 1/2007 | Ueyama ................ | B60W 30/16 |
| | | | 701/96 |
| 2007/0106445 A1 | 5/2007 | Suzuki et al. | |
| 2009/0187322 A1* | 7/2009 | Yasui .................... | B60W 10/06 |
| | | | 701/70 |
| 2010/0204897 A1* | 8/2010 | Labuhn ................. | B60K 31/02 |
| | | | 701/93 |
| 2012/0209492 A1* | 8/2012 | Choi ..................... | B60W 30/16 |
| | | | 701/96 |
| 2013/0211689 A1* | 8/2013 | Mizutani ............... | B60W 30/16 |
| | | | 701/96 |
| 2013/0304317 A1* | 11/2013 | Takiguchi ............ | B60K 26/021 |
| | | | 701/36 |
| 2014/0067187 A1* | 3/2014 | Ferguson ............. | B60W 30/00 |
| | | | 701/28 |
| 2014/0336898 A1 | 11/2014 | Schwindt et al. | |
| 2015/0039212 A1* | 2/2015 | Kido .................. | G08G 1/09623 |
| | | | 701/117 |
| 2015/0210279 A1* | 7/2015 | Agnew ................ | B60W 30/09 |
| | | | 701/48 |
| 2017/0240171 A1* | 8/2017 | Chia .................... | B60W 30/12 |

FOREIGN PATENT DOCUMENTS

| | | |
|---|---|---|
| DE | 102013016724 | 6/2015 |
| DE | 102014008487 | 6/2015 |
| JP | 2002-274295 | 9/2002 |
| JP | 2002-316629 | 10/2002 |
| JP | 2003-081074 | 3/2003 |
| JP | 2009115465 | 5/2009 |
| JP | 2010-179873 | 8/2010 |
| JP | 2010221858 | 10/2010 |
| JP | 2012-188029 | 10/2012 |
| JP | 2013100064 | 5/2013 |
| JP | 2014-189242 | 10/2014 |
| JP | 5639282 | 12/2014 |
| JP | 2015-101240 | 6/2015 |
| JP | 2015-151040 | 8/2015 |
| JP | 2016-102501 | 6/2016 |
| KR | 1020120094365 | 8/2012 |
| KR | 1020140020354 | 2/2014 |
| WO | 2015/097511 | 7/2015 |

\* cited by examiner

VEHICLE DRIVING CONTROL APPARATUS AND METHOD

CROSS-REFERENCE TO RELATED APPLICATION

This application claims the benefit of an earlier filing date and right of priority to Korean Patent Application No. 10-2016-0150556, filed on Nov. 11, 2016 in the Korean Intellectual Property Office, the disclosure of which is incorporated herein by reference.

TECHNICAL FIELD

The present disclosure generally relates to a vehicle driving control apparatus.

BACKGROUND

A vehicle is an apparatus that moves in a direction desired by a user riding therein. A typical example of the vehicle is an automobile.

A variety of sensors and electronic devices have been mounted in vehicles for the convenience of a user who uses the vehicle. In particular, for user driving convenience, an Advanced Driver Assistance System (ADAS) has been actively studied. In addition, efforts have been made to develop autonomous vehicles that autonomously perform driving operations.

SUMMARY

Implementations are disclosed herein that enable a vehicle driving control apparatus that adaptively controls driving operations of a vehicle based on surrounding conditions.

In one aspect, a vehicle driving control apparatus includes an object detection unit configured to detect an object located outside a vehicle; and at least one processor configured to provide a first control signal and a second control signal based on information regarding the object detected by the object detection unit, wherein the at least one processor provides the first control signal and the second control signal by: based on the information regarding the object, providing the first control signal to cause one of an increase or a decrease in a speed of the vehicle during a first time period; and based on the information regarding the object and based on the first control signal provided during the first time period, providing the second control signal to cause the other of the increase or the decrease in the speed of the vehicle during a second time period.

In some implementations, the at least one processor is further configured to determine both the first control signal and the second control signal prior to providing either the first control signal or the second control signal.

In some implementations, the at least one processor is further configured to determine both the first time period and the second time period prior to providing either the first control signal or the second control signal.

In some implementations, the at least one processor is further configured to determine at least one of the first time period or the second time period by: determining at least one location that corresponds to a start time of the at least one of the first time period or the second time period.

In some implementations, the at least one processor is further configured to provide the first control signal and the second control signal based on the vehicle being in a state of following a preceding vehicle.

In some implementations, the at least one processor is further configured to: acquire information regarding a roadway on which the vehicle is travelling; and provide the first control signal and the second control signal based on the information regarding the roadway on which the vehicle is travelling.

In some implementations, the at least one processor is further configured to: acquire information regarding an intersection ahead of the vehicle; before the vehicle enters the intersection, provide the first control signal during the first time period to reduce a speed of the vehicle; and after the vehicle exits the intersection, provide the second control signal to increase the speed of the vehicle.

In some implementations, the at least one processor is further configured to: acquire information regarding a traffic light and information regarding a pedestrian in an area around the intersection; and provide the first control signal and the second control signal based on a determination that the pedestrian is present on the roadway on which the vehicle is travelling in a state in which the traffic light is green.

In some implementations, the at least one processor is further configured to: acquire information regarding a curve ahead of the vehicle; before the vehicle enters the curve, provide the first control signal during the first time period to reduce a speed of the vehicle; and after the vehicle exits the curve, provide the second control signal during the second time period to increase a speed of the vehicle.

In some implementations, the at least one processor is further configured to: acquire information regarding a lane of the curve in which the vehicle is expected to travel; and based on the vehicle entering the curve, provide a steering control signal that controls the vehicle to travel closer to a lane-marker of the lane that is formed on a side of the lane that is farther from a curvature direction of the curve.

In some implementations, the at least one processor is further configured to: acquire information regarding a lane of the curve in which the vehicle is expected to travel; and based on the vehicle travelling in the middle of the curve, provide a steering control signal that controls the vehicle to travel closer to a lane-marker of the lane that is formed on a side of the lane that is closer to a curvature direction of the curve.

In some implementations, the at least one processor is further configured to: based on the vehicle entering the curve, provide a steering control signal that controls the vehicle to move to a lane that is closer to a curvature direction of the curve.

In some implementations, the at least one processor is further configured to: based on the vehicle exiting the curve, provide a steering control signal that controls the vehicle to move to a lane that is farther from a curvature direction of the curve.

In some implementations, the at least one processor is further configured to: acquire curvature information of the curve; and determine a start point of the first time period based on the curvature information.

In some implementations, the at least one processor is further configured to determine a degree of speed reduction for the vehicle based on the curvature information.

In some implementations, the at least one processor is further configured to: acquire information regarding a construction zone ahead of the vehicle; before the vehicle enters the construction zone, provide the first control signal during the first time period to reduce a speed of the vehicle; and after the vehicle exits the construction zone, provide the second control signal during the second time period to increase the speed of the vehicle.

In some implementations, the at least one processor is further configured to: acquire information regarding a crosswalk ahead of the vehicle; before the vehicle enters the crosswalk, provide the first control signal during the first time period to reduce a speed of the vehicle, and after the vehicle exits the crosswalk, provide the second control signal during the second time period to increase the speed of the vehicle.

In some implementations, the at least one processor is further configured to: acquire information regarding a traffic light and information regarding a pedestrian in an area around the crosswalk; and provide the first control signal and the second control signal based on a determination that the pedestrian is present in the crosswalk in a state in which the traffic light is green.

In some implementations, the at least one processor is further configured to: acquire traffic sign information that indicates at least one of speed limit information, tunnel information, accident prone area information, foggy area information, school zone information, or slippery road information; and provide the first control signal and the second control signal further based on the traffic sign information.

In some implementations, the at least one processor is further configured to: acquire information regarding a road surface obstacle located on a roadway being traveled by the vehicle; in a state in which the vehicle approaches the road surface obstacle within a first distance, provide the first control signal during the first time period to reduce a speed of the vehicle; and in a state in which the vehicle moves away from the road surface obstacle within a second distance, provide the second control signal during the second time period to increase the speed of the vehicle.

In some implementations, the at least one processor is further configured to: acquire information regarding a downhill slope ahead of the vehicle; before the vehicle enters the downhill slope, provide the first control signal during the first time period to reduce a speed of the vehicle; and after the vehicle exits the downhill slope, provide the second control signal during the second time period to increase the speed of the vehicle.

In some implementations, the at least one processor is further configured to: acquire information regarding an uphill slope ahead of the vehicle; before the vehicle enters the uphill slope, provide the first control signal during the first time period to increase a speed of the vehicle; and after the vehicle exits the uphill slope, provide the second control signal during the second time period to reduce a speed of the vehicle.

In another aspect, a vehicle driving control apparatus includes an object detection unit configured to detect an object located outside a vehicle; and at least one processor. The at least one processor is configured to provide a first control signal and a second control signal based on information regarding the object detected by the object detection unit, wherein the at least one processor provides the first control signal and the second control signal by: based on the information regarding the object, providing the first control signal to cause one of a right steering or a left steering of the vehicle during a first time period; and based on the information regarding the object and based on the first control signal provided during the first time period, providing the second control signal to cause the other of the right steering or the left steering of the vehicle during a second time period.

The details of other implementations are included in the following description and the accompanying drawings.

DETAILED DESCRIPTION

Figure 1:
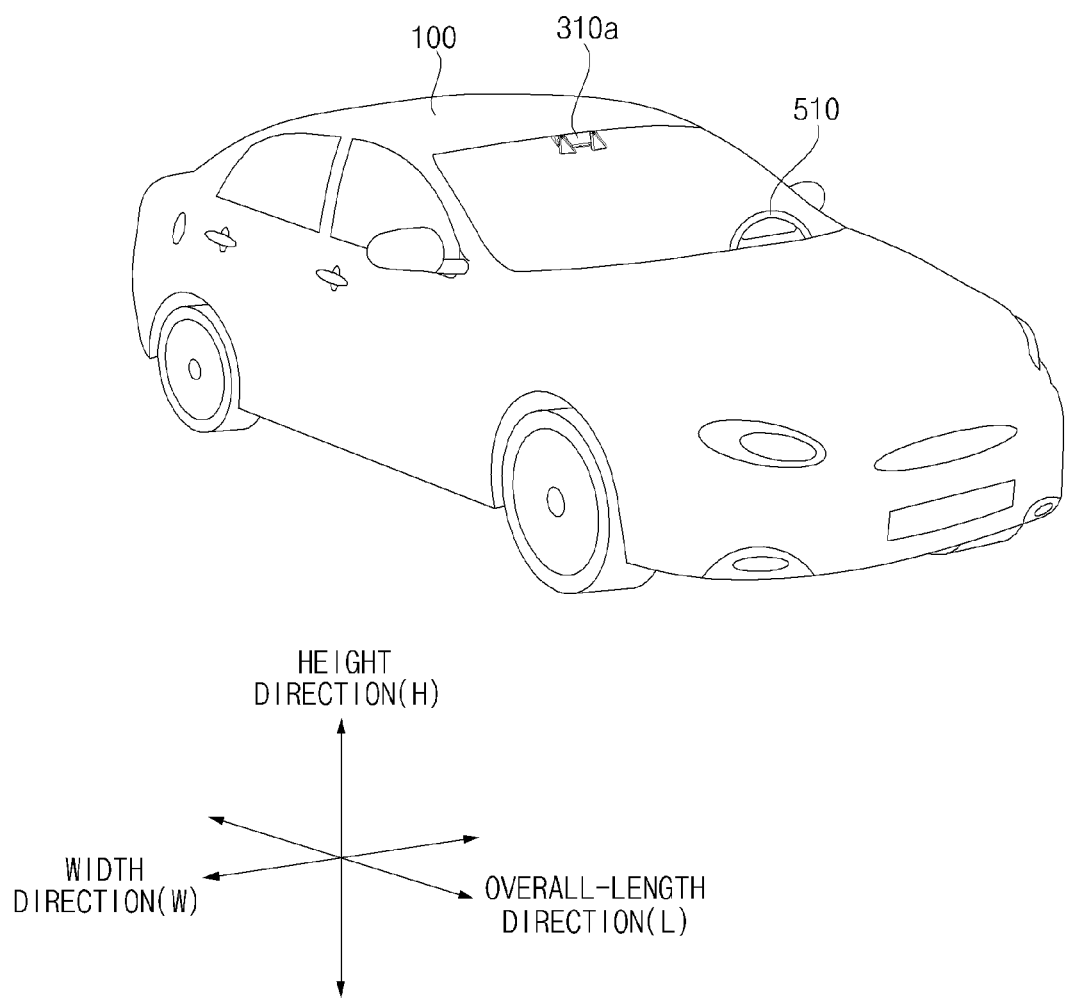
FIG. 1 is a diagram illustrating an example of a view of the external appearance of a vehicle according to an implementation.

In some scenarios, a driver assistance system may be implemented as an Adaptive Cruise Control (ACC). An ACC is designed to adaptively control a vehicle to follow a preceding vehicle or to travel at a preset speed. Some autonomous vehicles may operate autonomously based on such ACC functions.

However, an ACC may not be able to effectively adapt to changing conditions around the vehicle. For example, a variety of situations may occur during travel of a vehicle, but an ACC may not be able to adapt in a manner that is appropriate for the situation. Thus, the ACC may be limited in its ability to adapt to changing conditions around the vehicle, instead controlling vehicles in a more uniform manner.

The present disclosure has been made in view of the above problems, and it is one object of the present disclosure to provide a vehicle driving control apparatus that adaptively controls driving operations of a vehicle based on changing conditions around the vehicle. Such conditions may include information regarding an object outside the vehicle or information regarding a road on which the vehicle travels. The driving operations that are adaptively controlled may include, for example, a speed of the vehicle or a steering control of the vehicle.

It is another object of the present disclosure to provide a vehicle driving control apparatus that adaptively controls a location of a vehicle based on information regarding an object.

It is yet another object of the present disclosure to provide a vehicle that includes the vehicle driving control apparatus.

Objects of the present disclosure should not be limited to the aforementioned objects and other unmentioned objects will be clearly understood by those skilled in the art from the following description.

In some scenarios, implementations of the present disclosure may have one or more effects as follows.

First, a speed or location of a vehicle is controlled based on information regarding an object located outside the vehicle, so that the vehicle may travel efficiently.

Second, efficient travel of a vehicle may result in improved energy efficiency.

Third, driving safety may be ensured since a speed or location of a vehicle is adaptively controlled based on information regarding an object.

Effects of the present disclosure should not be limited to the aforementioned effects and other unmentioned effects will be clearly understood by those skilled in the art from the claims.

A vehicle as described in this specification may include any suitable vehicle, such as an automobile or a motorcycle. Hereinafter, a description will be given based on an automobile.

A vehicle as described in this specification may be powered by any suitable power source. For example, the vehicle may be an internal combustion engine vehicle including an engine as a power source, a hybrid vehicle including both an engine and an electric motor as a power source, or an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 2:
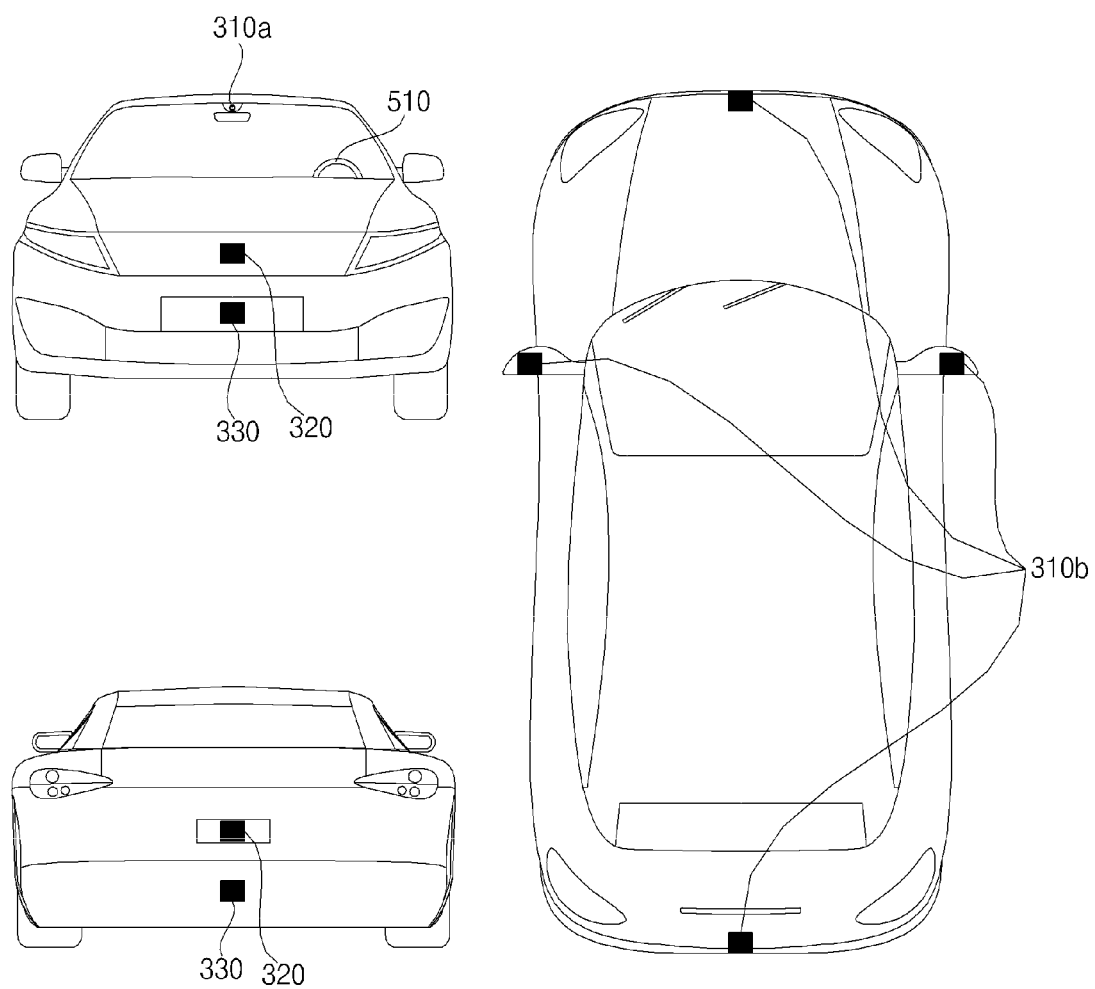
FIG. 2 is a diagram illustrating examples of different angled views of a vehicle according to an implementation.
Figure 3:
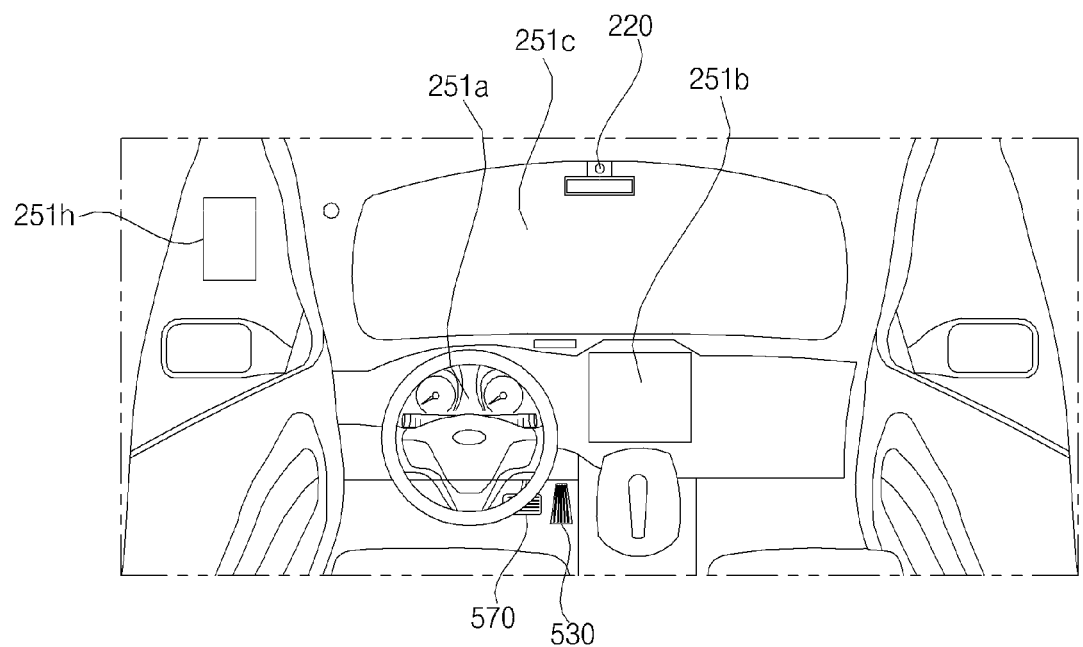
FIGS. 3 and 4 are diagrams illustrating examples of views of the internal configuration of a vehicle according to an implementation.
Figure 4:
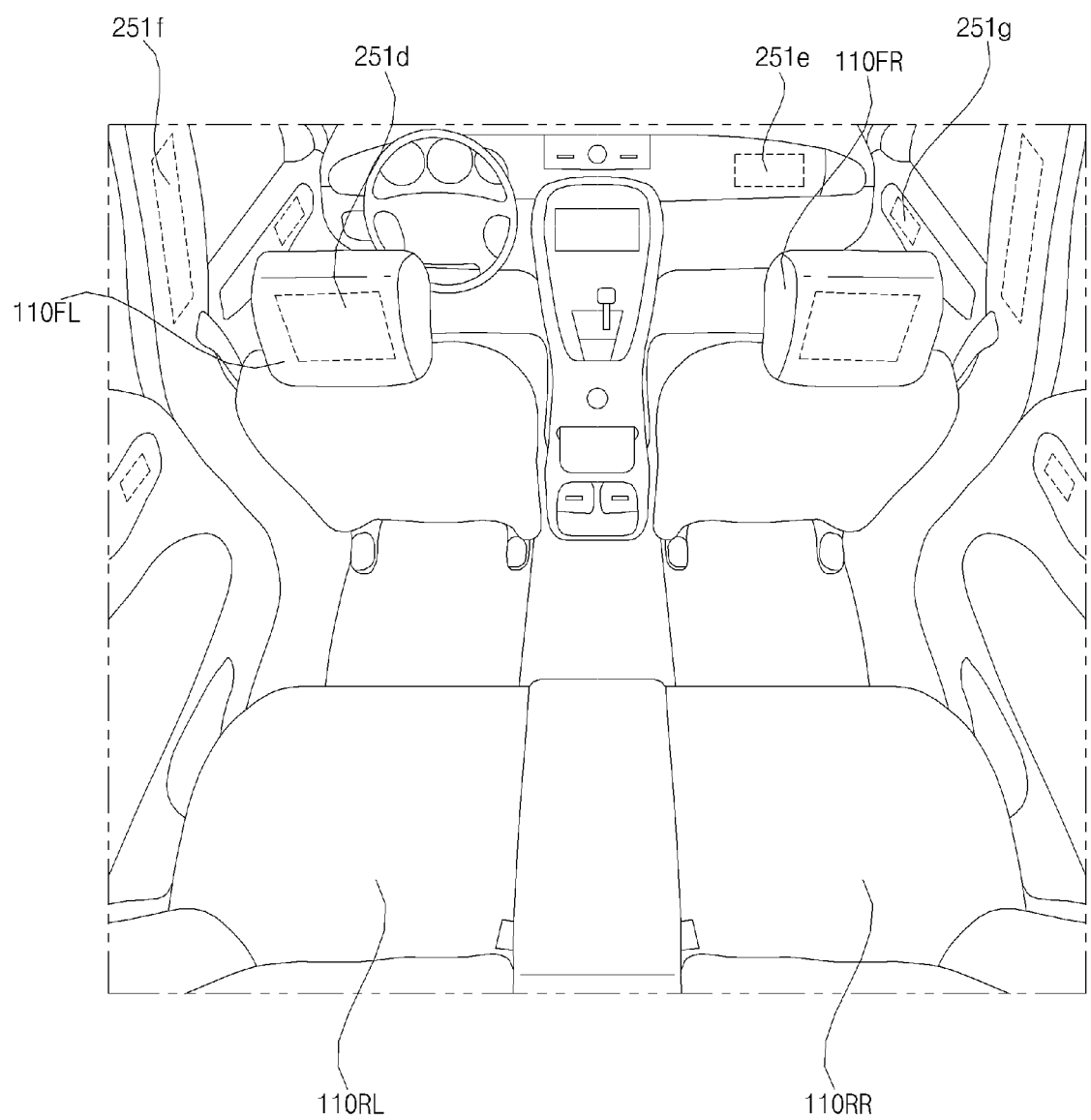
Figure 5:
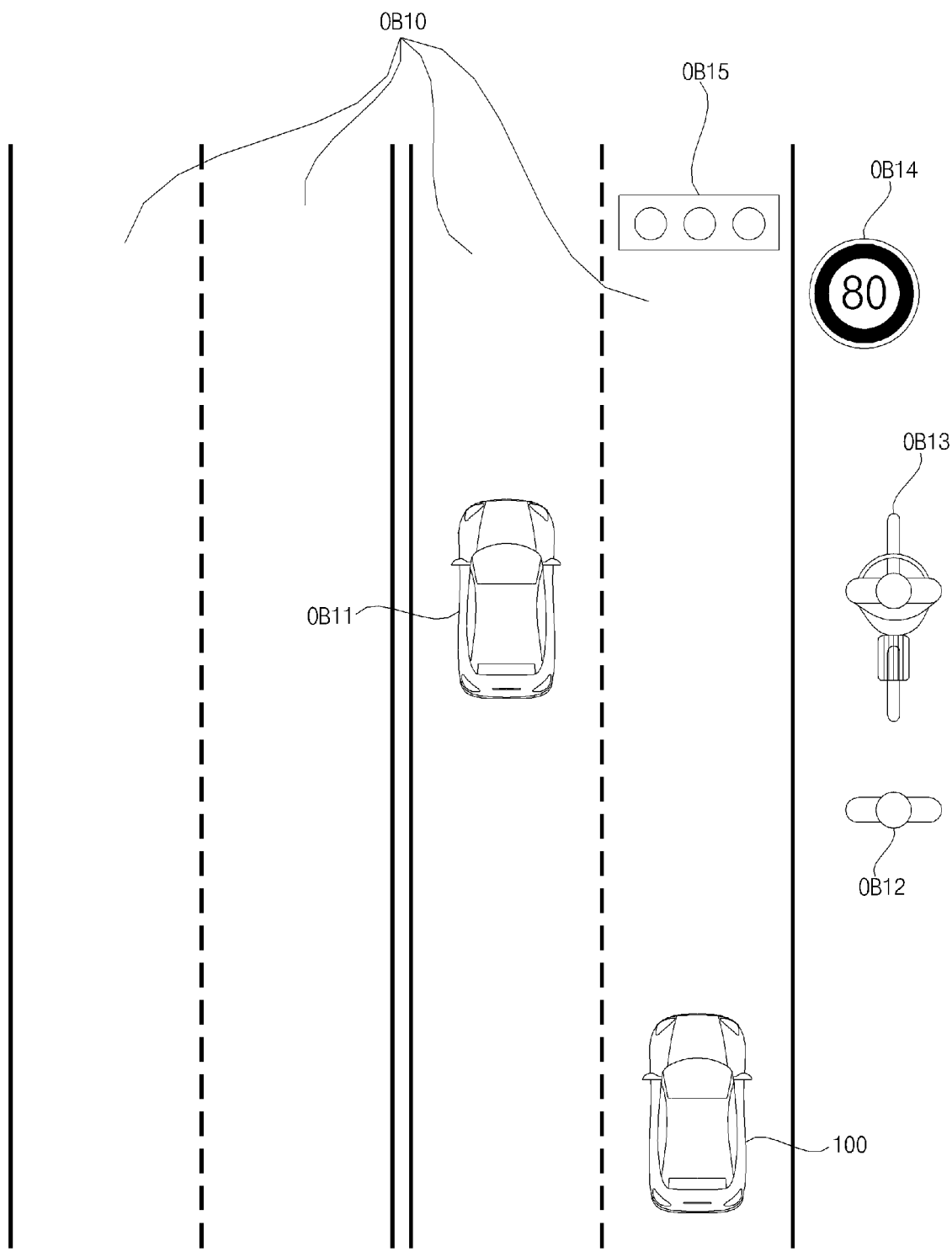
FIGS. 5 and 6 are diagrams illustrating examples of reference views of objects according to an implementation.
Figure 6:
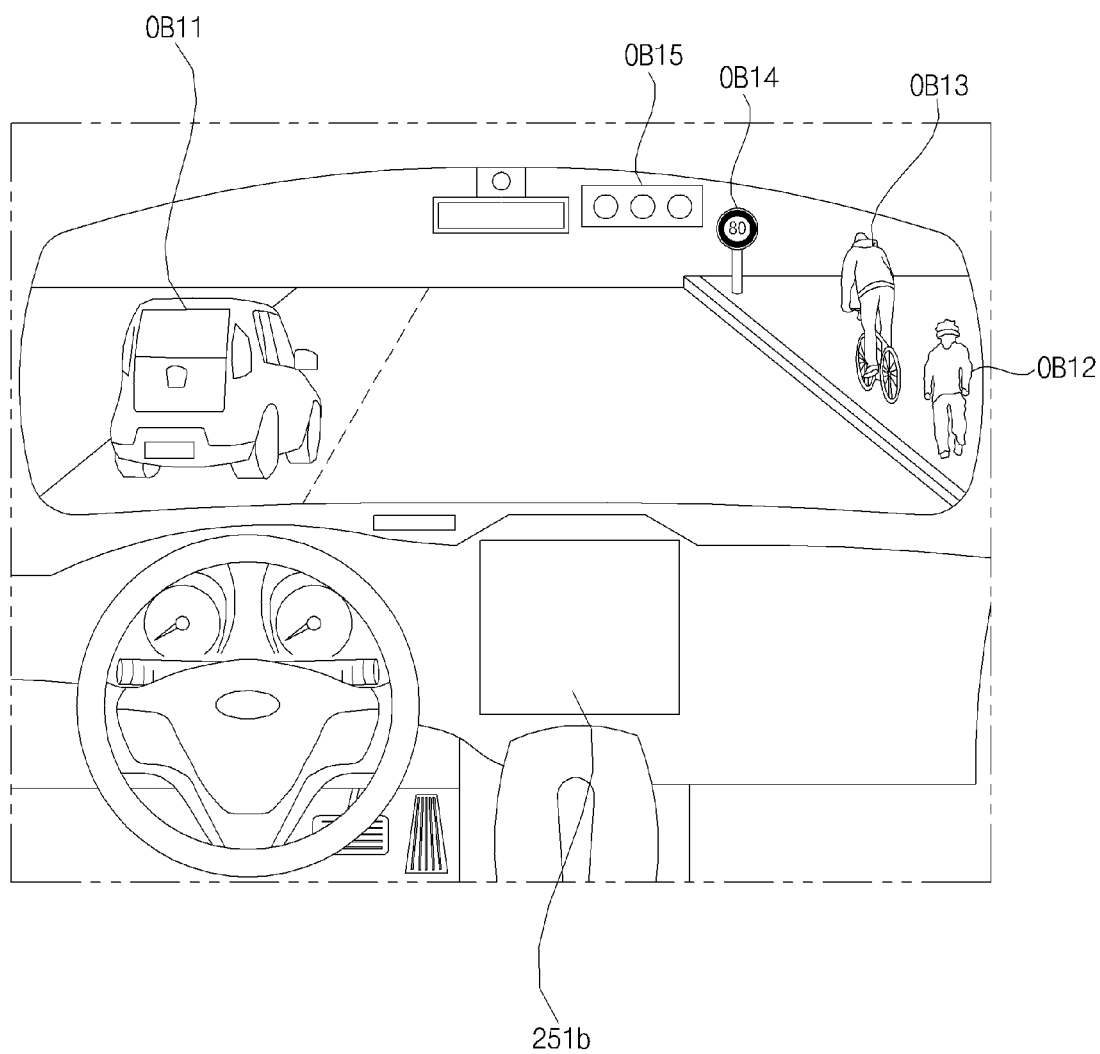
Figure 7:
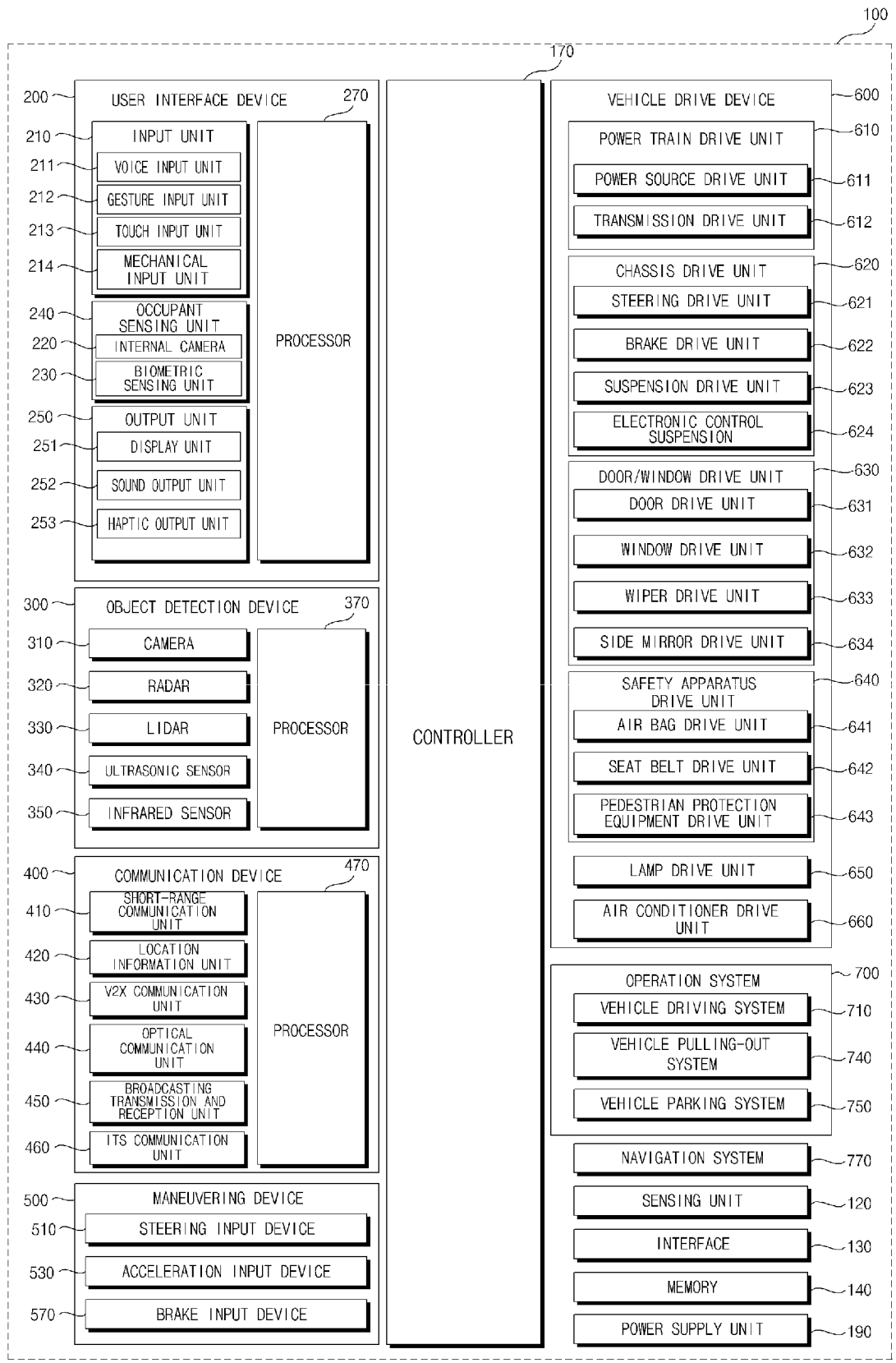
FIG. 7 is a block diagram illustrating an example of a vehicle according to an implementation.

FIG. 1 is a diagram illustrating an example of a view of the external appearance of a vehicle. FIG. 2 is a diagram illustrating examples of different angled views of a vehicle. FIGS. 3 and 4 are diagrams illustrating examples of views of the internal configuration of a vehicle. FIGS. 5 and 6 are diagrams illustrating examples of reference views of objects detected around a vehicle. FIG. 7 is a block diagram illustrating an example of a vehicle.

In the examples of FIGS. 1 to 7, a vehicle 100 may include a plurality of wheels, which are rotated by a power source, and a steering input device 510 for controlling the driving direction of the vehicle 100.

In some implementations, the vehicle 100 may be an autonomous vehicle that autonomously performs driving operations.

In some implementations, the vehicle 100 may be switched to an autonomous driving mode or a manual mode in response to a user input.

For example, in response to a user input received through a user interface apparatus 200, the vehicle 100 may be switched from a manual mode to an autonomous driving mode, or vice versa.

As another example, the vehicle 100 may be switched to an autonomous mode or a manual mode based on driving situation information.

The driving situation information may include, for example, at least one of the following: information regarding an object outside a vehicle, navigation information, or vehicle condition information.

For example, the vehicle 100 may be switched from the manual mode to the autonomous driving mode, or vice versa, based on driving situation information generated in the object detection apparatus 300.

As another example, the vehicle 100 may be switched from the manual mode to the autonomous driving mode, or vice versa, based on driving situation information received through a communication apparatus 400.

The vehicle 100 may be switched from the manual mode to the autonomous driving mode, or vice versa, based on information, data, and a signal provided from an external device.

When the vehicle 100 operates in the autonomous driving mode, the autonomous vehicle 100 may operate based on an operation system 700.

For example, the autonomous vehicle 100 may operate based on information, data, or signals generated in a driving system 710, a parking-out system 740, and a parking system 750.

While operating in the manual mode, the autonomous vehicle 100 may receive a user input for driving of the vehicle 100 through a driving operation device 500. In response to the user input received through the driving operation device 500, the vehicle 100 may operate.

The term "overall length" may refer to the length from the front end to the rear end of the vehicle 100, the term "overall width" may refer to the width of the vehicle 100, and the term "overall height" may refer to the height from the bottom of the wheel to the roof. In the following description, the term "overall length direction L" may refer to the reference direction for the measurement of the overall length of the vehicle 100, the term "overall width direction W" may refer to the reference direction for the measurement of the overall width of the vehicle 100, and the term "overall height direction H" may refer to the reference direction for the measurement of the overall height of the vehicle 100.

As illustrated in FIG. 7, the vehicle 100 may include the user interface apparatus 200, the object detection apparatus 300, the communication apparatus 400, the driving operation device 500, a vehicle drive apparatus 600, an operation system 700, a navigation system 770, a sensing unit 120, an interface unit 130, a memory 140, at least one processor such as a controller 170, and a power supply unit 190.

In some implementations, the vehicle 100 may further include other components in addition to the aforementioned components, or may not include some of the aforementioned components.

The user interface apparatus 200 is configured to communicate between the vehicle 100 and a user. The user interface apparatus 200 may receive a user input, and provide information generated in the vehicle 100 to the user. The vehicle 100 may implement User Interfaces (UI) or User Experience (UX) through the user interface apparatus 200.

The user interface apparatus 200 may include an input unit 210, an internal camera 220, a bio-sensing unit 230, an output unit 250, and at least one processor such as processor 270.

In some implementations, the user interface apparatus 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be located inside the vehicle 100. For example, the input unit 210 may be disposed in one region of a steering wheel, one region of an instrument panel, one region of a seat, one region of each pillar, one region of a door, one region of a center console, one region of a head lining, one region of a sun visor, one region of a windshield, or one region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of optical output units for outputting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be integrally formed with a display unit 251 as one body to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle. The processor 270 may sense a user's condition based on the images of the inside of the vehicle. The processor 270 may acquire information regarding eye gaze information of the user. The processor 270 may sense a gesture of the user from the images of the inside of the vehicle.

The bio-sensing unit 230 may acquire biological information of the user. The bio-sensing unit 230 may include a sensor for acquire biological information of the user, and may utilize the sensor to acquire finger print information, heart rate information, etc. of the user. The biological information may be used for user authentication.

The output unit 250 is configured to generate a visual, acoustic, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface device 200 may include a plurality of display units 251a to 251g.

The display unit 251 may be disposed in one region 251a of a steering wheel, one region 251b or 251e of an instrument panel, one region 251d of a seat, one region 251f of each pillar, one region 251g of a door, one region of a center console, one region of a head lining, one region of a sun visor, one region 251c of a windshield, or one region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output thereof.

The processor 270 may control the overall operation of each unit of the user interface apparatus 200.

In some implementations, the user interface apparatus 200 may include a plurality of processors 270 or may not include the processor 270.

In a case where the user interface apparatus 200 does not include the processor 270, the user interface apparatus 200 may operate under the control of the controller 170 or a processor of a different device inside the vehicle 100.

In some implementations, the user interface apparatus 200 may be referred to as a display device for vehicles.

The user interface apparatus 200 may operate under the control of the controller 170.

The object detection apparatus 300 is configured to detect an object located outside the vehicle 100. The object detection apparatus 300 may generate object information based on sensing data.

The object information may include information as to whether any object exists, location information of an object, information regarding distance between the vehicle 100 and the object, and information regarding speed of the vehicle relative to the object.

The object may include various objects related to travelling of the vehicle 100.

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling or a lane next to the lane in which the vehicle 100 is traveling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic lamp OB15, a traffic sign OB14, and a pattern or text painted on a road surface.

The light may be light generated by a lamp provided in the nearby vehicle. The light may be light generated by a street light. The light may be solar light.

The road may include a road surface, a curve, and slopes, such as an uphill slope and a downhill slope.

The structure may be a body located around the road in the state of being fixed onto the ground. For example, the structure may include a streetlight, a roadside tree, a building, a traffic lamp, and a bridge.

The geographical feature may include a mountain and a hill. In some implementations, the object may be classified as a movable object or a stationary object. For example, the movable object may include a nearby vehicle and a pedestrian. For example, the stationary object may include a traffic signal, a road, and a structure.

The object detection apparatus 300 may implement any suitable technology to detect the presence of an object. For example, in some implementations, the object detection apparatus 300 may include one or more of a camera 310, a radar 320, a lidar 330, an ultrasonic sensor 340, or an infrared sensor 350.

In some implementations, the object detection device 300 may further include other components in addition to the aforementioned components. For example, in some implementations, the object detection apparatus 300 may include at least one processor, such as processor 370.

In some implementations, the object detection apparatus 300 may include fewer than the aforementioned components. For example, in some implementation The camera 310 may be located at an appropriate position outside the vehicle in order to acquire images of the outside of the vehicle. The camera 310 may be a mono camera, a stereo camera 310a, an Around View Monitoring (AVM) camera 310b, or a 360-degree camera.

The camera 310 may utilize various image processing algorithms to acquire location information of the object, information regarding the distance to the object, and information regarding the speed relative to the object.

For example, the camera 310 may acquire the information regarding the distance to the object and the information regarding the speed relative to the object, based on a change in size of the object over time in acquired images.

For example, the camera 310 may acquire the information regarding distance to the object and the information regarding the speed relative to the object through a pin hole model or through profiling a road surface.

In another example, the camera 310 may acquire the information regarding the distance to the object and the information regarding the speed relative to the object, based on information regarding disparity between stereo images acquired by the stereo camera 310a.

For example, the camera 310 may be disposed near a front windshield in the vehicle in order to acquire images of the front of the vehicle. Alternatively, the camera 310 may be disposed around a front bumper or a radiator grill.

In another example, the camera 310 may be disposed near a rear glass in the vehicle in order to acquire images of the rear of the vehicle. Alternatively, the camera 310 may be disposed around a rear bumper, a trunk, or a tailgate.

In yet another example, the camera 310 may be disposed near at least one of the side windows in the vehicle in order to acquire images of the side of the vehicle. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 may control the overall operation of each unit of the object detection apparatus 300.

The processor 370 may detect or classify an object by comparing sensing data with pre-stored data, the sensing data which is sensed by the camera 310, the radar 320, the lidar 330, the ultrasonic sensor 340, and the infrared sensor 350.

The processor 370 may detect an object and track the detected object based on acquired images. The processor 370 may, for example, calculate the distance to the object and the speed relative to the object.

For example, based on change in size over time of an object in acquired images, the processor 370 may acquire information regarding distance to the object and information regarding speed relative to the object.

For example, the processor 370 may acquire information regarding distance to an object and information regarding speed relative to the object, by utilizing a pin hole model or by profiling a road surface.

For example, based on information regarding disparity of stereo images acquired by a stereo camera 310*a*, the camera 310 may acquire the information regarding distance to an object and information regarding speed relative to the object.

The processor 370 may detect an object and track the detected object based on a reflection electromagnetic wave which is formed as a result of reflection a transmission electromagnetic wave by the object. Based on the electromagnetic wave, the processor 370 may, for example, calculate the distance to the object and the speed relative to the object.

The processor 370 may detect an object and track the detected object based on a reflection laser light which is formed as a result of reflection of transmission laser by the object. Based on the laser light, the processor 370 may, for example, calculate the distance to the object and the speed relative to the object.

The processor 370 may detect an object and track the detected object based on a reflection ultrasonic wave which is formed as a result of reflection of a transmission ultrasonic wave by the object. Based on the ultrasonic wave, the processor 370 may, for example, calculate the distance to the object and the speed relative to the object.

The processor 370 may detect an object and track the detected object based on reflection infrared light which is formed as a result of reflection of transmission infrared light by the object. Based on the infrared light, the processor 370 may, for example, calculate the distance to the object and the speed relative to the object.

In some implementations, the object detection apparatus 300 may include a plurality of processors 370 or may not include the processor 370. For example, each of the camera 310, the radar 320, the lidar 330, the ultrasonic sensor 340, and the infrared sensor 350 may include its own processor.

In a case where the object detection apparatus 300 does not include the processor 370, the object detection apparatus 300 may operate under the control of the controller 170 or a processor inside the vehicle 100.

The object detection apparatus 300 may operate under the control of the controller 170.

The communication apparatus 400 is configured to perform communication with an external device. Here, the external device may be a nearby vehicle, a mobile terminal, or a server.

To perform communication, the communication apparatus 400 may include at least one selected from among a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and at least one processor such as processor 470.

In some implementations, the communication apparatus 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (e.g., vehicle to infra (V2I) communication), wireless communication between a vehicle and another vehicle (e.g., vehicle to vehicle (V2V) communication), or wireless communication between a vehicle and a pedestrian (e.g., vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication apparatus 400.

In some implementations, the communication apparatus 400 may include a plurality of processors 470, or may not include the processor 470.

In a case where the communication apparatus 400 does not include the processor 470, the communication apparatus 400 may operate under the control of the controller 170 or a processor of a device inside of the vehicle 100.

In some implementations, the communication apparatus 400 may implement a vehicle display device, together with the user interface apparatus 200. In this case, the vehicle display device may be referred to as a telematics device or an Audio Video Navigation (AVN) device.

The communication apparatus 400 may operate under the control of the controller 170.

The driving manipulation apparatus 500 is configured to receive a user input for driving the vehicle 100.

In the manual mode, the vehicle 100 may operate based on a signal provided by the driving operation device 500.

The driving manipulation apparatus 500 may include a steering input device 510, an acceleration input device 530, and a brake input device 570.

The steering input device 510 may receive a user input with regard to the driving direction of the vehicle 100. The steering input device 510 may take the form of a wheel to enable a steering input through the rotation thereof. In some implementations, the steering input device may be configured as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The driving manipulation apparatus 500 may operate under the control of the controller 170.

The vehicle drive apparatus 600 is configured to electrically control the operation of various devices of the vehicle 100.

The vehicle drive apparatus 600 may include a power train drive unit 610, a chassis drive unit 620, a door/window drive unit 630, a safety equipment drive unit 640, a lamp drive unit 650, and an air conditioner drive unit 660.

In some implementations, the vehicle drive apparatus 600 may further include other components in addition to the aforementioned components, or may not include some of the aforementioned components.

In some implementations, the vehicle drive apparatus 600 may include at least one processor. Each unit of the vehicle drive apparatus 600 may include its own at least processor(s).

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under the control of the controller 170.

In a case where an electric motor is the power source, the power source drive unit 611 may control the motor. The power source drive unit 610 may control, for example, the RPM and toque of the motor under the control of the controller 170.

The transmission drive unit 612 may perform control of a transmission.

The transmission drive unit 612 may adjust the state of the transmission. The transmission drive unit 612 may change the transmission to a drive (D), reverse (R), neutral (N), or park (P) state.

In some implementations, in a case where an engine is the power source, the transmission drive unit 612 may adjust a gear-engaged state to the drive (D) state.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the driving direction of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may perform control such that a different degree-braking force is applied to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a seat belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The seat belt drive unit 642 may perform electronic control of a seatbelt apparatus inside the vehicle 100. For example, upon detection of a dangerous situation, the seat belt drive unit 642 may control passengers to be fixed onto seats 110FL, 110FR, 110RL, and 110RR with seat belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive apparatus 600 may include at least one processor. Each unit of the vehicle dive device 600 may include its own processor(s).

The vehicle drive apparatus 600 may operate under the control of the controller 170.

The operation system 700 is a system for controlling the overall driving operation of the vehicle 100. The operation system 700 may operate in the autonomous driving mode.

The operation system 700 may include the driving system 710, the parking-out system 740, and the parking system 750.

In some implementations, the operation system 700 may further include other components in addition to the aforementioned components, or may not include some of the aforementioned component.

In some implementations, the operation system 700 may include at least one processor. Each unit of the operation system 700 may include its own processor(s).

In some implementations, the operation system 700 may be implemented as software that is executed by one or more processors, such as controller 170, to perform control of overall driving operations of the vehicle 100.

The operation system 700 may have any suitable number of components. For example, in some implementations, the operation system 700 may include at least one selected from among the user interface apparatus 200, the object detection apparatus 300, the communication apparatus 400, the driving manipulation apparatus 500, the vehicle drive apparatus 600, the navigation system 770, the sensing unit 120, or the controller 170.

The driving system 710 may perform driving of the vehicle 100.

For example, the driving system 710 may receive navigation information from the navigation system 770 and provide a control signal to the vehicle drive apparatus 600 to perform driving of the vehicle 100.

The driving system 710 may receive object information from the object detection apparatus 300 and provides a control signal to the vehicle drive apparatus 600 to perform driving of the vehicle 100.

The driving system 710 may receive a signal from an external device through the communication apparatus 400 and provides a control signal to the vehicle drive apparatus 600 to perform driving of the vehicle 100.

The driving system 710 may be a system which includes at least one selected from among the user interface apparatus 200, the object detection apparatus 300, the communication apparatus 400, the driving manipulation apparatus 500, the vehicle drive apparatus 600, the navigation system 770, the sensing unit 120, and the controller 170 to perform driving of the vehicle 100.

In some implementations, the driving system 710 may be referred to as a vehicle driving control apparatus.

The parking-out system 740 may perform a parking-out operation of the vehicle 100.

The parking-out system 740 may receive navigation information from the navigation system 770 and provide a control signal to the vehicle drive apparatus 600 to perform a parking-out operation of the vehicle 100.

The parking-out system 740 may receive object information from the object detection apparatus 300 and provides a control signal to the vehicle drive apparatus 600 to perform a parking-out operation of the vehicle 100.

The parking-out system 740 may receive a signal from an external device through the communication apparatus 400 and provide a control signal to the vehicle drive apparatus 600 to perform a parking-out operation of the vehicle 100.

The parking-out system 740 may be a system which includes at least one selected from among the user interface apparatus 200, the object detection apparatus 300, the communication apparatus 400, the vehicle manipulation apparatus 500, the vehicle drive apparatus 600, the navigation system 770, the sensing unit 120, and the controller 170 to perform a parking-out operation of the vehicle 100.

The parking-out system 740 may be referred to as a vehicle parking-out control apparatus.

The parking system 750 may perform a parking-in operation of the vehicle 100.

The parking system 750 may receive navigation information from the navigation system 770 and provide a control signal to the vehicle drive apparatus 600 to perform a parking-in operation of the vehicle 100.

The parking system 750 may receive object information from the object detection apparatus 300 and provide a control signal to the vehicle drive apparatus 600 to perform a parking operation of the vehicle 100.

The parking system 750 may receive a signal from an external device through the communication apparatus 400 and provide a control signal to the vehicle drive apparatus 600 to perform a parking-in operation of the vehicle 100.

The vehicle parking system 750 may be a system which includes at least one selected from among the user interface apparatus 200, the object detection apparatus 300, the communication apparatus 400, the vehicle manipulation apparatus 500, the vehicle drive apparatus 600, the navigation system 770, the sensing unit 120, and the controller 170 to perform a parking-in operation of the vehicle 100.

The parking system 750 may be referred to as a vehicle parking-in control apparatus.

The navigation system 770 may provide navigation information. The navigation information may include at least one selected from among map information, information regarding a set destination, information regarding a route to the set destination, information regarding various objects along the route, lane information, and information regarding a current location of the vehicle.

The navigation system 770 may include a memory and at least one processor. The memory may store navigation information. The processor may control the operation of the navigation system 770.

In some implementations, the navigation system 770 may update pre-stored information by receiving information from an external device through the communication apparatus 400.

In some implementations, the navigation system 770 may be classified as a sub-component of the user interface apparatus 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle state information may be information that is generated based on data sensed by a variety of sensors inside a vehicle.

For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface unit 130 may serve as a passage for various kinds of external devices that are connected to the vehicle 100. For example, the interface unit 130 may have a port that is connectable to a mobile terminal and may be connected to the mobile terminal via the port. In this case, the interface unit 130 may exchange data with the mobile terminal.

In some implementations, the interface unit 130 may serve as a passage for the supply of electrical energy to a mobile terminal connected thereto. When the mobile terminal is electrically connected to the interface unit 130, the interface unit 130 may provide electrical energy, supplied from the power supply unit 190, to the mobile terminal under the control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be implemented as a sub-component of the controller 170.

The controller 170 may control the overall operation of each unit inside the vehicle 100. The controller 170 may be referred to as an Electronic Control Unit (ECU).

The power supply unit 190 may supply power required to operate each component under the control of the controller 170. In particular, the power supply unit 190 may receive power from, for example, a battery inside the vehicle.

Figure 8:
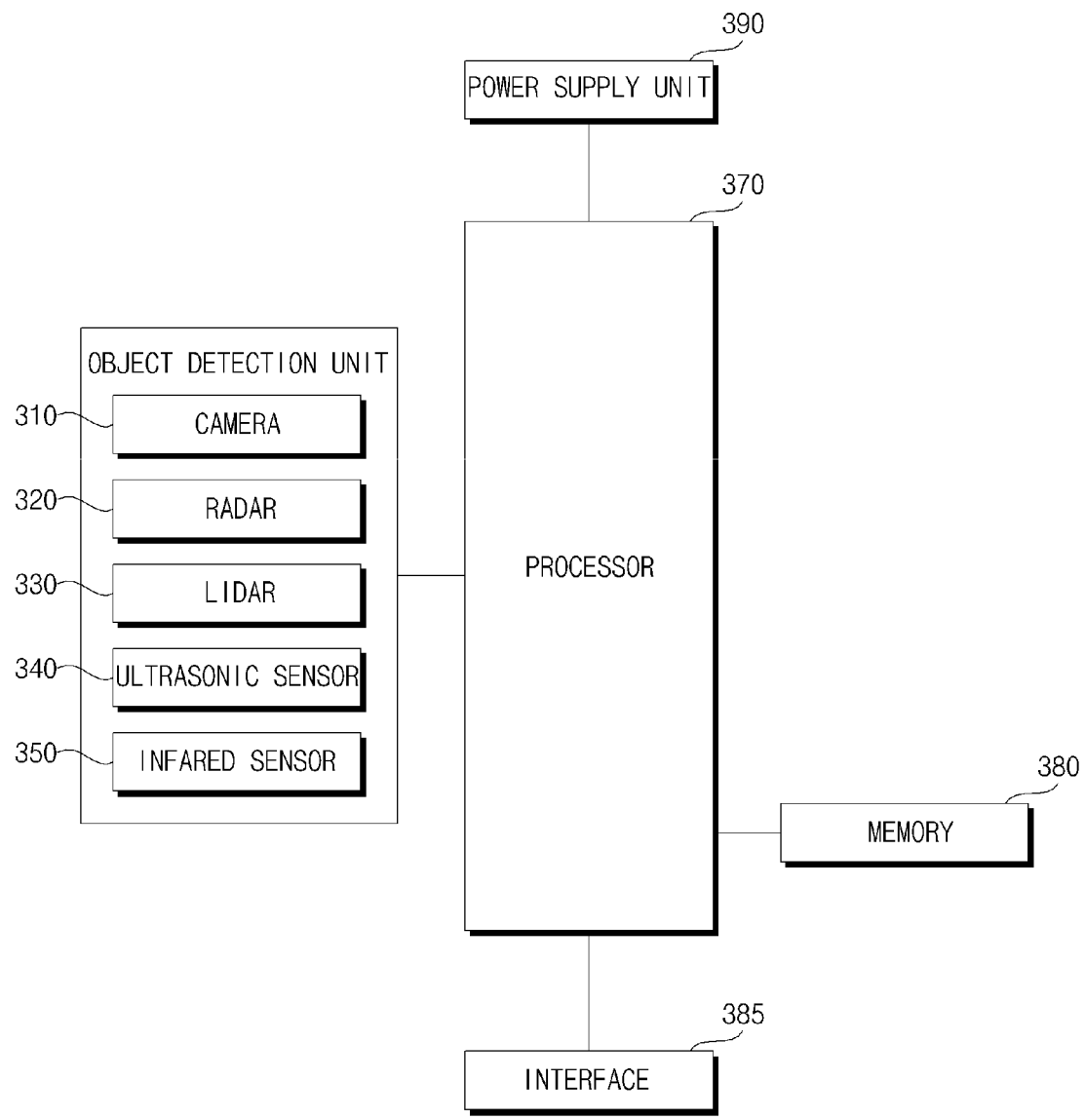
FIG. 8 is a block diagram illustrating an example of a vehicle driving control apparatus according to an implementation.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions FIG. 8 is a block diagram illustrating a vehicle driving control apparatus according to an implementation.

Referring to FIG. 8, a vehicle driving control apparatus 710 may include an object detection unit 301, an interface 385, a memory 380, at least one processor such as processor 370, and a power supply unit 390.

The object detection unit 301 may implement any suitable technology to detect an object located outside a vehicle. For example, in some implementations, the object detection unit 301 may include at least one of a camera 310, a radar 320, a lidar 330, an ultrasonic sensor 340, or an infrared sensor 350.

The interface 385 may exchange data with apparatuses and devices of a vehicle 100.

The memory 380 is electrically connected to the processor 370. The memory 380 may store basic data for each unit, control data for the operational control of each unit, and input/output data. The memory 380 may be any of various hardware storage devices, such as a ROM, a RAM, an EPROM, a flash drive, and a hard drive. The memory 380 may store various data for the overall operation of the vehicle driving control apparatus 710, such as programs for the processing or control of the processor 370.

In some implementations, the memory 380 may be integrally formed with the processor 370 or may be an element included in the processor 370.

The processor 370 may receive information regarding an object from the object detection unit 301.

The object may include, for example, a roadway being traveled by a vehicle, a traffic light, a pedestrian, a traffic sign, a nearby vehicle, a place of a traffic accident, a bump, or a hi-pass section.

The processor 370 may generate one or more control signals based on information regarding an object. The processor 370 may provide the generated control signal(s) to the vehicle drive apparatus 660 through the interface 385.

For example, based on information regarding an object, the processor 370 may provide, during a first time period, a first control signal to increase or reduce a speed of the vehicle 100.

In some implementations, the processor 370 may determine the first time period based on the environment outside the vehicle 100, such as geographic information, object information, or roadway information. The first time period may correspond to such geographic, object, or roadway information.

For example, the processor 370 may determine a start point of the first time period based on distance between the vehicle 100 and an object. As a specific example, based on the distance between the vehicle 100 and the object, the processor 270 may determine a degree of speed reduction. The processor 370 may determine a deceleration rate.

In some implementations, the processor 370 may determine a start point of the first time period based on a speed at which the vehicle 100 traveled before the first time period.

For example, the processor 370 may determine a degree of speed reduction based on a speed of the vehicle 100 before the first time period. The processor 370 may determine a deceleration rate.

Based on information regarding an object, the processor 370 may provide, during a second time period, a second signal to control the vehicle 100 in a manner contrary to how the vehicle 100 is controlled in accordance with the first control signal. As such, the second control signal during the second time period may counteract the effects of the first control signal in the first time period.

In some implementations, the processor 370 may determine the second time period based on environmental conditions outside the vehicle 100, such as geographic information, object information, or roadway information. The second time period may correspond to such geographic, object, or roadway information.

As an example, during the first time period, the processor 370 may provide a first control signal to reduce a speed of the vehicle 100. The processor 370 may reduce the speed of the vehicle 100 using a variety of techniques.

For example, the processor 370 may reduce the speed of the vehicle 100 by providing the first control signal to operate a brake apparatus. As another example, the processor 370 may reduce the speed of the vehicle 100 by providing the first control signal to control the vehicle 100 to be in a released state. The released state may be a state in which a power source is not driven at all, a brake apparatus does not operate, and, in turn, a speed of the vehicle 100 is reduced only by frictions between tires and a road surface.

Then, during a second time period, the processor 370 may provide a second control signal to increase a speed of the vehicle 100. In this case, the processor 370 may perform a control action such that a speed of the vehicle 100 after the second time period becomes equal to a speed of the vehicle 100 before the first time period.

As another example, during the first time period, the processor 370 may provide a first control signal to increase a speed of the vehicle 100.

Then, during the second time period, the processor 370 may provide a second control signal to reduce a speed of the vehicle 100. In this case, the processor 370 may perform a control action such that a speed of the vehicle 100 after the second time period becomes equal to a speed of the vehicle 100 before the first time period.

For example, the processor 370 may provide a second control signal to operate a brake apparatus.

For example, the processor 370 may provide a second signal to control the vehicle 100 to be in a released state.

During a first time period, the processor 370 may provide, based on information regarding an object, a first control signal so that the vehicle 100 moves to the right side or the left side in a driving direction of the vehicle 100.

During a second time period, the processor 370 may provide, based on information regarding an object, a second control signal to control the vehicle 100 in a manner contrary to how the vehicle 100 is controlled in accordance with the first control signal. As such, the second control signal that is applied during the second time period may counteract the effects of the first control signal applied during the first time period.

For example, during a first time period, the processor 370 may provide a first control signal so that the vehicle 100 moves to the left side in the driving direction of the vehicle 100. In this case, the processor 370 may provide a first control signal so that a braking force applied to left wheels of the vehicle 100 becomes greater than a braking force applied to the right wheels of the vehicle 100. As a result, the vehicle 100 may move to the left side in the driving direction.

Next, during a second time period, the processor 370 may provide a second control signal so that the vehicle 100 moves to the right side in the driving direction thereof. In this case, the processor 370 may provide a second control signal so that a braking force applied to the right wheels of the vehicle 100 becomes greater than a braking force applied to the left wheels of the vehicle 100. As a result, the vehicle 100 may move to the right side in the driving direction thereof.

In this case, the processor 370 may perform a control action such that a lateral position of the vehicle 100 after the second time period becomes the same as a lateral position of the vehicle 100 before the first time period. A lateral position may indicate a position of the vehicle 100 in an overall width direction with reference to a traffic lane.

For example, during a first time period, the processor 370 may provide a first control signal so that the vehicle 100 moves to the right side in the driving direction thereof. In this case, the processor 370 may provide a first control signal so that a braking force applied to the right wheels of the vehicle 100 becomes greater than the braking force applied to the right wheels. As a result, the vehicle 100 may move to the right side in the driving direction thereof.

Next, during a second time period, the processor 370 may provide a second control signal so that the vehicle 100 moves to the left side in the driving direction thereof. In this case, the processor 370 may provide a second control signal so that a braking force applied to the left wheels of the vehicle 100 becomes greater than a braking force applied to the right wheels. As a result, the vehicle 100 may move to the left side in the driving direction thereof.

In this case, the processor 370 may perform a control action such that a lateral position of the vehicle 100 after the second time period becomes the same as a lateral position of the vehicle 100 before the first time period. A lateral position may be a position of the vehicle 100 in an overall width direction with reference to a traffic lane.

In some implementations, the processor 370 may determine both the first control signal and the second control signal prior to providing either the first or second control signals. As such, the processor 370 may determine a sequence of control signals for the vehicle 100 based on expected environmental conditions. In some implementations, the processor 370 may also determine the timing of first and second time periods during which the first and second control signals are to be applied. In some scenarios, the first and second time periods may correspond to, or be represented by, geographic or locational information for the vehicle 100. As such, the processor 370 may determine a sequence of control signals and conditions under which those control signals are each applied, based on expected environmental conditions for the vehicle 100.

Figure 10A:
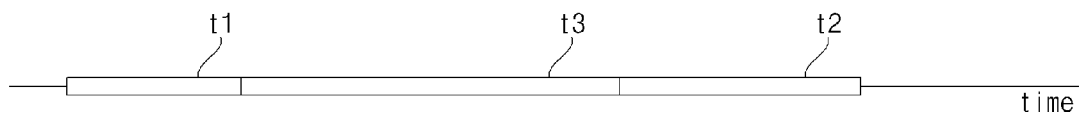
FIGS. 10A and 10B are diagrams illustrating examples of a first time period and a second time period according to an implementation.
Figure 10B:
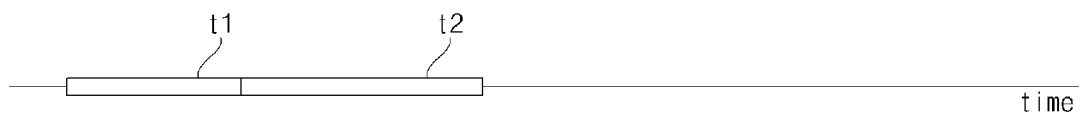

FIGS. 10A and 10B are views referenced to explaining a first time period and a second time period according to an implementation.

With reference to the drawings, the second time period t2 may be a time period after the first time period t1. The first time period t1 may be a time period before the second time period t2.

The first time period may be variable. For example, the processor 370 may provide a first control signal for a time period of a few seconds, a few tens of seconds, a few minutes, or a few tens of minutes according to a circumstance.

The second time period may be variable. For example, the processor 370 may provide a second control signal for a time period of a few seconds, a few tens of seconds, a few minutes, or a few tens of seconds according to a circumstance.

In some implementations, the processor 370 may set the first time period and the second time period to have an equal duration. For example, both of the first time period and the second time period may be set as three minutes.

In some implementations, the processor 370 may set the first time period and the second time period to have different durations. For example, the processor 370 may set the first time period to be longer than the second time period. For example, the processor 370 may set the first time period to be shorter than the second time period. For example, the processor 370 may set the second time period to be longer than the first time period. For example, the processor 370 may set the second time period to be shorter than the first time period.

In a case where the first control signal is a signal for reducing a speed of the vehicle 100, the start point of the first time period may be a point in time when the speed of the vehicle 100 starts to decrease.

In a case where the first control signal is a signal for reducing a speed of the vehicle 100, the end point of the first time period may be a point in time when the speed of the vehicle 100 comes to be at a constant level or starts to increase.

In a case where the first control signal is a signal for increasing a speed of the vehicle 100, the start point of the first time period may be a point in time when the speed of the vehicle 100 starts to increase.

In a case where the first control signal is a signal for increasing the speed of the vehicle 100, the end point of the first time period may be a point in time when the speed of the vehicle 100 comes to remain at a constant level or starts to decrease.

The time periods t1 and t2 may be adjacent or may be separated in time, as illustrated in FIGS. 10A and 10B.

For example, as illustrated in FIG. 10A, a third time period t3 may exist between the second time period t2 and the first time period t1.

During the first time period t1, the processor 370 may provide a first control signal to reduce a speed of the vehicle 100. Next, during the third time period t3, the processor 370 may provide a third control signal to maintain a speed of the vehicle 100 at a constant level. Next, during the second time period t2, the processor 370 may provide a second control signal to increase a speed of the vehicle 100.

During the first time period t1, the processor 370 may provide a first control signal to increase a speed of the vehicle 100. Next, during the third time period t3, the processor 370 may provide a third control signal to maintain a speed of the vehicle 100 at a constant level. Next, during the second time period t2, the processor 370 may provide a second control signal to reduce a speed of vehicle 100.

During the first time period t1, the processor 370 may provide a first control signal so that the vehicle 100 moves to the left side in the driving direction thereof. Next, during the third time period t3, the processor 370 may provide a third control signal so that a lateral position of the vehicle 100 is maintained with reference to a traffic line. Next, during the second time period t2, the processor 370 may provide a second control signal so that the vehicle 100 moves to the right side in the driving direction thereof.

During the first time period t1, the processor 370 may provide a first control signal so that the vehicle 100 moves to the right side in the driving direction thereof. Next, during the third time period t3, the processor 370 may provide a third control signal so that a lateral position of the vehicle 100 is maintained with reference to a traffic line. Next, during the second time period t2, the processor 370 may provide a second control signal so that the vehicle 100 moves to the right side in the driving direction thereof.

As another example, as illustrated in FIG. 10B, in some implementations, the second time period t2 may be adjacent to the first time period 1.

During the first time period t1, the processor 370 provides a first control signal to reduce speed of the vehicle 100. Next, during the second time period t2, the processor 370 may provide a second control signal to increase a speed of the vehicle 100.

During the first time period t1, the processor 370 may provide a first control signal to increase a speed of the vehicle 100. Next, the second time period t2, the processor 370 may provide a second control signal to reduce a speed of the vehicle 100.

During the first time period t1, the processor 370 may provide a first control signal so that the vehicle 100 moves to the left side in the driving direction thereof. Next, during the second time period t2, the processor 370 may provide a second control signal so that the vehicle 100 moves to the right side in the driving direction thereof.

During the first time period t1, the processor 370 may provide a first control signal so that the vehicle 100 moves to the right side in the driving direction thereof. Next, during the second time period t2, the processor 370 may provide a second control signal so that the vehicle 100 moves to the right side in the driving direction thereof.

As described in the various implementations above, by implementing different driving control signals during different periods of time, the vehicle is able to adaptively perform various types of driving operations based on the surrounding environment.

As an example, referring back to FIG. 8, the processor 370 may provide first and second control signals when the vehicle 100 is following a preceding vehicle.

The first control signal may be a signal that is generated and provided by the processor 370 during a first time period to increase or reduce the speed of the vehicle 100.

The second control signal may be a signal that is generated and provided by the processor 370 during a second time period in order to control the vehicle 100 in a manner contrary to how the vehicle 100 is controlled in accordance with the first control signal. As such, the second control signal applied during the second time period may counteract the effects of the first control signal applied during the first time period.

The vehicle driving control apparatus 710 may be implemented as a driver assistance apparatus. For example, the vehicle driving control apparatus 710 may be implemented as an Adaptive Cruise control (ACC).

In this case, the processor 370 may provide a control signal to the vehicle drive apparatus 600 so as to control the vehicle 100 to follow a preceding vehicle. If there is no preceding vehicle within a reference distance, the processor 370 may provide a control signal to the vehicle drive apparatus 600 so that the vehicle 100 travels at a preset speed.

The processor 370 may acquire, via the object detection unit, information regarding a roadway being traveled by the vehicle 100.

Object information may include the information regarding a roadway being traveled by the vehicle 100.

The information regarding a roadway being traveled by the vehicle 100 may include intersection information, curve information, construction zone information, crosswalk information, traffic sign information, road surface obstacle information, slope information, accident information, and bumper information.

In some implementations, the processor 370 may acquire information regarding a roadway being traveled by the vehicle 100 from an external server or a nearby vehicle through the communication apparatus 400. For example, the processor 370 may acquire information regarding a roadway being traveled by the vehicle 100 from a preceding vehicle through the communication apparatus 400. For example, the processor 370 may receive information regarding a roadway being traveled by the vehicle 100, the information which is reported by a nearby vehicle, from a traffic system through the communication apparatus 400.

In some implementations, the processor 370 may acquire, via the navigation system 770, information regarding a roadway being traveled by the vehicle 100. The processor 370 may acquire information regarding a roadway being traveled by the vehicle 100, based on map information provided by the navigation system 770.

The processor 370 may provide first and second control signals based on information regarding a roadway being traveled by the vehicle 100.

As such, as control operations are performed based on information regarding a roadway being traveled by the vehicle 100, a safe driving function may be implemented and convenience may be provided.

The processor 370 may acquire intersection information which is information regarding an intersection in front of the vehicle 100.

The intersection may indicate an area in which a roadway of a specific direction crosses each other. For example, the intersection may include a three-way intersection, a four-way intersection, an entrance ramp, and an exit ramp.

Before the vehicle 100 enters an intersection, the processor 370 may provide, during a first time period, a first control signal to reduce a speed of the vehicle 100.

After the vehicle 100 exits the intersection, the processor 370 may provide, during a second time period, a second control signal to increase a speed of the vehicle 100.

When the vehicle 100 is travelling within an intersection region, the processor 370 may provide, during a third time period, a third control signal to maintain a speed of the vehicle 100 at a constant level.

In general, a traffic accident is more likely to occur at an intersection, compared to a regular roadway. To prevent a traffic accident, traffic lights are set up at an intersection, but accidents still happen because some drivers or pedestrians do not follow the instruction of the traffic light.

The vehicle 100 may prevent an accident by reducing its speed before entering an accident prone intersection. In addition, after exiting the intersection, the vehicle 100 may be controlled to travel at a speed at which the vehicle 100 traveled before entering the intersection, so that the vehicle 100 may return to the same state as before entering the intersection.

The processor 370 may further acquire traffic light information and pedestrian information which is information regarding a pedestrian in the area around an intersection. The area around an intersection may indicate an area within a predetermined distance from the intersection.

For example, the camera 310 may include a stereo camera which captures an area forward of the vehicle 100. The stereo camera is able to acquire a stereo image of an area forward of the vehicle 100. By performing image processing on the stereo image, the processor 370 may acquire information regarding an intersection, information regarding a traffic light located at an intersection, and information regarding a pedestrian in the area around the intersection.

For example, via the communication apparatus 400, the processor 370 may acquire information regarding an intersection, information regarding a traffic light located at the intersection, and information regarding a pedestrian in the area around the intersection.

If it is determined a pedestrian is on a roadway being traveled by the vehicle 100 even when the traffic light is green, the processor 370 may provide a first control signal or a second control signal based on the determination.

When the traffic light at an intersection is green in a driving direction of the vehicle 100, the vehicle 100 may travel without reducing the speed. If it is determined that a pedestrian is crossing a roadway with ignoring the instruction of the traffic light, the vehicle 100 needs to reduce the speed for the safety of the pedestrian despite the green traffic light.

The processor 370 may acquire information regarding a curve in front of the vehicle 100.

For example, the processor 370 may acquire information regarding a curve via the camera 310. For example, the processor 370 may acquire information regarding a curve via the communication apparatus 400. For example, the processor 370 may acquire information regarding a curve via the navigation system 770.

Information regarding a curve may include information regarding a lane expected to be traveled by a vehicle in the curve, and curvature information of the curve.

The curve may indicate a road section which is curved with a predetermined curvature to the left or right side in a driving direction of a vehicle 100.

Before the vehicle 100 enters a curve, the processor 370 may provide, during a first time period, a first control signal to reduce a speed of the vehicle 100.

After the vehicle 100 enters the curve, the processor 370 may provide, during a second time period, a second control signal to increase a speed of the vehicle 100.

When the vehicle 100 is travelling the curve, the processor 370 may provide, for a third time period, a third control signal to maintain a speed of the vehicle 100 at a constant level.

In general, a traffic accident is more likely to happen in a curved road than a straight road. If the vehicle 100 enters a curve at high speeds, it may cause an understeer or oversteer sensation, increasing a possibility of a traffic accident.

Before entering a curve in which an accident is highly likely to happen, the vehicle 100 may reduce its speed to prevent a traffic accident. In addition, after exiting the curve, the vehicle 100 may be controlled to travel at a speed at which the vehicle 100 traveled before entering the curve, so that the vehicle 100 may return to the same state as before entering of the curve.

In some implementations, the processor 370 may also acquire information regarding a lane expected to be traveled by the vehicle in the curve.

For example, via the camera 310, the processor 370 may acquire the information regarding a lane expected to be traveled by the vehicle in the curve.

When the vehicle 100 enters a curve, the processor 370 may provide a steering control signal so that the vehicle 100 travels close to a line of the lane, which is formed in a direction opposite to a curvature direction of the curve. The processor 370 may provide a steering control signal so that the vehicle 100 travels close to a line of the lane, which is formed in a direction opposite to a direction toward the center of curvature of the curve.

When the vehicle 100 is travelling in the middle of the curve, the processor 370 may provide a steering control signal so that the vehicle 100 travels close to a line of the lane, which is formed in a curvature direction of the curve. The processor 370 may provide a steering control signal so that the vehicle 100 travels close to a line of the lane, which is formed in a direction toward the center of curvature of the curve. The middle of the curve may indicate an arithmetical center between the start point and the end point of the curve.

When the vehicle 100 exits the curve, the processor 370 may provide a steering control signal so that the vehicle 100 travels close to a line of the lane, which is formed in a direction opposite to a curvature direction of the curve. The processor 370 may provide a steering control signal so that the vehicle 100 travels close to a line of the lane, which is formed in a direction opposite to the center of curvature of the curve.

In this manner, the vehicle 100 is controlled to travel as straight as possible, so that the probability for understeer or oversteer sensation to occur in a curve may be minimized, thereby preventing an accident.

Based on curve information, the processor 370 may provide a steering control signal to control the vehicle 100 to change a lane.

When the vehicle enters a curve, the processor 370 may provide a steering control signal so that the vehicle 100 moves into a lane that is formed in a curvature direction of the curve. The processor 370 may provide a steering control signal for controlling the vehicle 100 to move into a next lane that is formed in a direction toward the center of curvature of the curve.

When the vehicle 100 exits a curve, the processor 370 may provide a steering control signal so that the vehicle 100 moves to a lane that is formed in a direction opposite to a curvature direction of the curve. The processor 370 may provide a steering control signal so that the vehicle 100 moves to a next lane that is formed in a direction opposite to a direction toward the center of curvature of the curve.

In this manner, the vehicle 100 may be controlled to travel as straight as possible, so that the probability for an understeer or oversteer sensation to occur on a curve may be minimized, thereby preventing an accident.

In some implementations, a curvature direction may indicate a direction toward the center of a circle including a curve. In addition, a direction opposite to a curvature direction may indicate a direction from the center of a circle including a curve toward the circumference of the circle.

The processor 370 may acquire curvature information of a curve.

The processor 370 may determine a start point of a first time period based on the curvature information.

Suppose that the vehicle 100 travels a first curve and a second curve at the same speed. If a first curvature value of the first curve is greater than a second curvature value of the second curve, the processor 370 may set the first time period for the first curve to start at an earlier point than a start point of the first time period for the second curve The processor 370 may determine a degree of speed reduction based on curvature information. The processor 370 may determine a deceleration rate.

Suppose that the vehicle 100 travels the first curve and the second curve at the same speed. If a first curvature value of the first curve is greater than a second curvature value of the second curve, the processor 370 may reduce the speed of the vehicle 100 in the first curve to a greater extent than when the vehicle 100 travels in the second curve.

The processor 370 may acquire information regarding an upcoming construction zone.

Before the vehicle 100 enters a construction zone, the processor 370 may provide, during a first time period, a first control signal to reduce a speed of the vehicle 100.

After the vehicle 100 exits the construction zone, the processor 370 may provide, during a second time period, a second control signal to increase a speed of the vehicle 100.

When the vehicle 100 is travelling the construction zone, the processor 370 may provide, during a third time period, a third control signal to maintain a speed of the vehicle 100 at a constant level.

During travel in a construction zone, any unexpected situation could happen. In such a situation, a traffic accident could occur. Thus, before entering a construction zone, the vehicle 100 may reduce its speed to prevent a traffic accident. In addition, after exiting the construction zone, the vehicle 100 may maintain a speed at which the vehicle traveled before entering the construction zone, and therefore, the vehicle 100 may be able to return to the same state as before entering the construction zone.

The processor 370 may acquire information regarding a crosswalk that is in front of the vehicle 100.

Before the vehicle 100 enters the crosswalk, the processor 370 may provide, during a first time period, a first control signal to reduce a speed of the vehicle 100.

After the vehicle 100 exits the crosswalk, the processor 370 may provide, during the second time period, a second control signal to increase a speed of the vehicle 100.

When the vehicle 100 is travelling the crosswalk, the processor 370 may provide, during a third time period, a third control signal to maintain a speed of the vehicle 100 at a constant level.

Many accidents happen and many lives are lost at crosswalks. Traffic lights are set up to prevent such traffic accidents, but, if a driver or pedestrian ignores a traffic signal, an accident can still happen.

Before entering an intersection at which a deadly traffic accident could happen, the vehicle 100 may be controlled to reduce its speed, thereby preventing such a traffic accident. In addition, after exiting a crosswalk, the vehicle 100 may be controlled to maintain a speed at which the vehicle 100 traveled before entering the crosswalk, so that the vehicle 100 may return to the same state as before entering the crosswalk.

The processor 370 may further acquire information regarding a traffic light and information regarding a pedestrian in the area around a crosswalk. The area around the crosswalk may indicate an area within a predetermined distance from the crosswalk.

For example, the camera 310 may include a stereo camera which captures an area forward of the vehicle 100. The stereo camera may acquire a stereo image of an area forward of the vehicle 100. By performing image processing on the stereo image, the processor 370 may acquire information regarding a crosswalk, information regarding a traffic light at the crosswalk, and information regarding a pedestrian in the area around the crosswalk.

For example, via the communication apparatus 400, the processor 370 may acquire information regarding a crosswalk, information regarding a traffic light at the crosswalk, and information regarding a pedestrian in the area around the crosswalk.

If it is determined that a pedestrian is still in a crosswalk even when the traffic light is green, the processor 370 may provide a first control signal and a second control signal based on the determination.

If a traffic light at a crosswalk is green in a driving direction of the vehicle 100, the vehicle 100 may travel the crosswalk without reducing its speed. If it is determined that a pedestrian ignoring the traffic signal is now crossing the roadway, the vehicle 100 needs to reduce its speed for the safety of the pedestrian even though the traffic light is green.

The processor 370 may acquire information regarding a traffic sign. The traffic sign may indicate at least one of speed limit information, tunnel information, accident prone area information, foggy area information, school zone information, and slippery road information.

The processor 370 may provide the first control signal and the second control signal further based on the information regarding a traffic sign.

The processor 370 may acquire road surface obstacle which indicates an obstacle present on a roadway being traveled by the vehicle 100. The road surface obstacle may include a pothole, a sinkhole, a puddle, snow, black ice, and a cracked portion of the roadway.

When the vehicle 100 approaches the road surface obstacle within a first distance, the processor 370 may provide, during a first time period, a first control signal to reduce a speed of the vehicle 100.

When the vehicle 100 has passed a second distance or less from the road surface obstacle, the processor 370 may provide, during a second time period, a second control signal to increase a speed of the vehicle 100.

The processor 370 may acquire information regarding a slope section that is in front of the vehicle 100.

The information regarding a slope section may include information regarding a downhill slope section and information regarding an uphill slope section.

The processor 370 may provide a first control signal and a second control signal based on the information regarding a slope.

The processor 370 may acquire information regarding a downhill slope section located ahead of the vehicle 100.

Before the vehicle 100 enters a downhill slope section, the processor 370 may provide, during a first time period, a first control signal to reduce a speed of the vehicle 100.

After the vehicle 100 exits the downhill slope section, the processor 370 may provide, during a second time period, a second control signal to increase a speed of the vehicle 100.

When vehicle 100 is travelling in the downhill slope, the processor 370 may provide, during a third time period, a third control signal to maintain a speed of the vehicle 100 at a constant level.

The processor 370 may acquire information regarding an uphill slope located ahead of the vehicle 100.

Before the vehicle 100 enters an uphill slope, the processor 370 may provide, during a first time period, a first control signal to increase a speed of the vehicle 100.

After the vehicle 100 exits the uphill slope, the processor 370 may provide, during a second time period, a second control signal to reduce a speed of the vehicle 100.

When the vehicle 100 is travelling in the uphill slope, the processor 370 may provide, during a third time period, a third control signal to maintain a speed of the vehicle 100 at a constant level.

The power supply unit 390 may provide power required for operation of each element by control of the processor 370. The power supply unit 390 may be supplied with power from a battery inside the vehicle 100.

In some implementations, if a user input by the driving manipulation apparatus 500 is received while the vehicle driving control apparatus 710 performs control operations, the vehicle driving control apparatus 710 may stop operating and the vehicle 100 may operate in accordance with the user input by the driving manipulation apparatus 500. If a user input by the driving manipulation apparatus 500 stops being received, the vehicle driving control apparatus 710 may start the control operation again.

Figure 9:
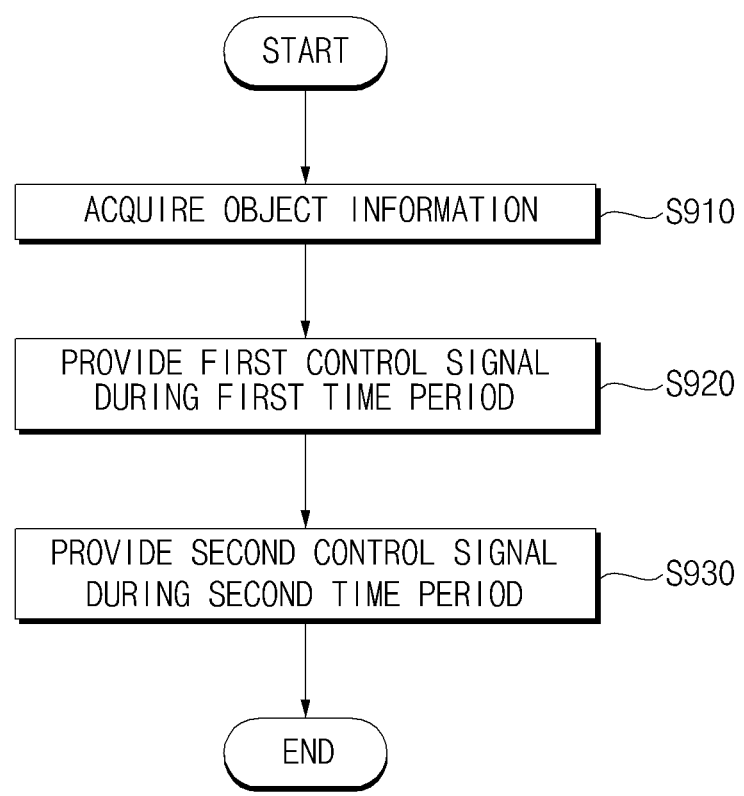
FIG. 9 is a flowchart illustrating an example of an operation of a vehicle driving control apparatus according to an implementation.

FIG. 9 is a flowchart referenced to explain operation of a vehicle driving control apparatus according to an implementation.

Referring to FIG. 9, the processor 370 may acquire object information in S910.

The processor 370 may acquire object information via the object detection unit 301.

The processor 370 may acquire object information via the communication apparatus 400.

The vehicle driving control apparatus 710 may further include the communication apparatus 400.

In this case, the processor 370 may acquire object information via the communication apparatus 400.

The vehicle driving control apparatus 710 may further include the navigation system 770.

In this case, the processor 370 may acquire object information via the navigation system 770.

The object information may include traffic line information, nearby vehicle information, pedestrian information, two-wheeled vehicle information, traffic signal information, light information, road information, structure information, bumper information, geographical feature information, animal information, etc.

The object information may include information regarding a roadway being traveled by the vehicle 100.

The information regarding a roadway being traveled by the vehicle 100 may include intersection information, curve information, construction zone information, crosswalk information, traffic sign information, road surface obstacle information, slope information, accident information, and bumper information.

The processor 370 may provide a first control signal based on object information during a first time period in S920.

Next, the processor 370 may provide a second control signal based on the object information during a second time period in S930. The second control signal may be a control signal to control the vehicle 100 in a manner contrary to how the vehicle 100 is controlled in accordance with the first control signal.

For example, the processor 370 may provide, during a first time period, a first control signal to reduce a speed of the vehicle 100. Next, the processor 370 may provide, during a second time period, a second control signal to increase a speed of the vehicle 100.

For example, the processor 370 may provide, during a first time period, a first control signal to increase a speed of the vehicle 100. Next, the processor may provide, during a second time period, a second control signal to reduce a speed of the vehicle 100.

For example, the processor 370 may provide, during a first time period, a first control signal so that the vehicle 100 moves to the left side in the driving direction of the vehicle. Next, the processor 370 may provide, during a second time period, a second control signal so that the vehicle 100 moves to the right side in the driving direction of the vehicle 100.

For example, the processor 370 may provide, during a first time period, a first control signal so that the vehicle 100 moves to the right side in the driving direction thereof. Next, the processor 370 may provide, during a second time period, a second control signal so that the vehicle 100 moves to the left side in the driving direction thereof.

Figure 11:
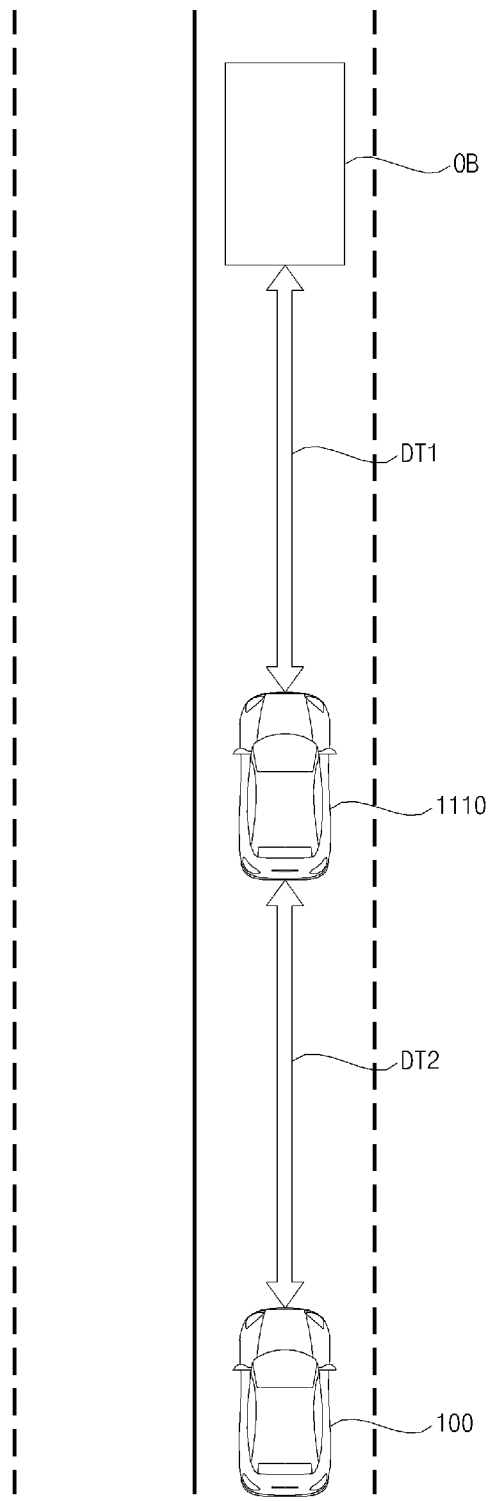
FIG. 11 is a diagram illustrating an example of an operation of a vehicle driving control apparatus when a vehicle is following a preceding vehicle, according to an implementation.

FIG. 11 is a view referenced to explain operation of a vehicle driving control apparatus when a vehicle is following a preceding vehicle, according to an implementation.

Referring to FIG. 11, the vehicle driving control apparatus 710 may provide the vehicle drive apparatus 600 with a control signal for following a preceding vehicle 1110. The vehicle 100 may follow the preceding vehicle 1110 in accordance with the control signal.

When the vehicle 100 is following the preceding vehicle 1110, the processor 370 may acquire information regarding an object OB.

The processor 370 may provide a control signal based on the information regarding the object OB.

Based on the information regarding the object OB, the processor 370 may provide, during a first time period, a first control signal to increase or reduce a speed of the vehicle 100.

Based on the information regarding the object OB, the processor 370 may provide, during a second time period, a second control signal to control the vehicle 100 in a manner contrary to how the vehicle 100 is controlled in accordance with the first control signal.

Further based on a first distance DT1 between the object OB and the preceding vehicle 1110 and a second distance DT2 between the vehicle 100 and the preceding vehicle 1110, the processor 370 may provide a control signal.

For example, if the first distance DT is gradually reduced, the processor 370 may provide a control signal to gradually increase the second distance DT2. In this case, the processor 370 may provide, during a first time period, a first control signal to reduce a speed of the vehicle 100.

Next, if the preceding vehicle 1110 and the vehicle 100 pass the object OB, the processor 370 may provide a control signal to gradually reduce the second distance DT2. In this case, the processor 370 may provide, during a second time period, a second control signal to increase the speed of the vehicle 100.

Figure 12:
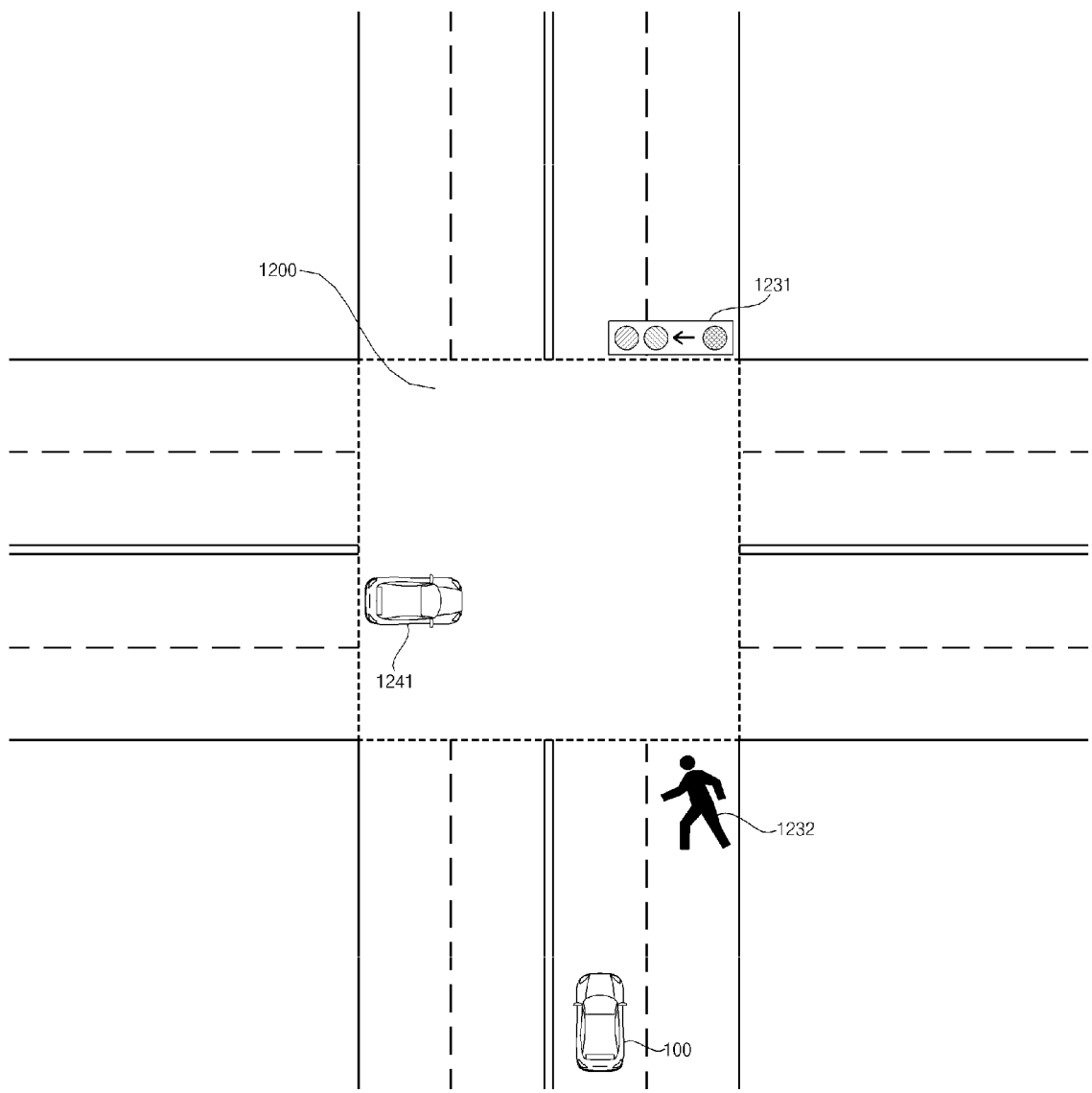
FIG. 12 is a diagram illustrating an example of an operation of a vehicle driving control apparatus that provides a control signal based on information regarding an intersection according to an implementation.

FIG. 12 is a view referenced to explain operation of a vehicle driving control apparatus which provides a control signal based on intersection information, according to an implementation.

Referring to FIG. 12, the processor 370 may acquire information regarding an intersection 1200 in front of the vehicle 100. The information regarding the intersection 1200 may include information as to existence of an intersection, information regarding a location of the intersection, and information regarding a distance between the vehicle 100 and the intersection 1200.

The processor 370 may acquire the information regarding the intersection 1200 via the object detection unit 301. For example, the processor 370 may acquire the information regarding the intersection 1200 by detecting the intersection 1200 from a stereo image of an area forward of the vehicle 100, the stereo image which is acquired by a stereo camera.

The processor 370 may acquire the information regarding the intersection 1200 via the communication apparatus 400. For example, the processor 370 may acquire the information regarding the intersection 1200 from a traffic system via the communication apparatus 400. For example, the processor 370 may acquire the information regarding the intersection 1200 from a nearby vehicle via the communication apparatus 400. The nearby vehicle may be a preceding vehicle that is travelling ahead of the vehicle 100.

The processor 370 may acquire the information regarding the intersection 1200 via the navigation system 770. For example, the processor 370 may acquire the information regarding the intersection 1200 based on map information provided by the navigation system 770.

The processor 370 may provide a first control signal and a second control signal based on the information regarding an intersection 1200.

Before the vehicle 100 enters the intersection 1200, the processor 370 may provide, during a first time period, a first control signal to reduce a speed of the vehicle 100.

The processor 370 may determine a start point of the first time period based on a distance between the vehicle 100 and the intersection 1200.

The processor 370 may determine a degree of speed reduction based on the distance between the vehicle 100 and the intersection 1200. The processor 370 may determine a deceleration rate.

The processor 370 may determine a start point of the first time period based on a speed at which the vehicle 100 traveled before the first time period.

The processor 370 may determine a degree of speed reduction based on the speed at which the vehicle 100 traveled before the first time period. The processor 370 may determine a deceleration rate.

After the vehicle 100 exits the intersection 1200, the processor 370 may provide, during a second time period, a second control signal to increase a speed of the vehicle 100.

The processor 370 may further acquire information regarding a traffic light 1231, and information regarding a pedestrian 1232 located in the area around a crosswalk. The area around a crosswalk may indicate an area within a predetermined distance from the crosswalk.

The processor 370 may acquire the information regarding the traffic light 1231 and information regarding the pedestrian 1232 via the object detection unit 301.

The processor 370 may acquire the information regarding the traffic light 1231 and the information regarding the pedestrian 1232 from a traffic system or a nearby vehicle via the communication apparatus 400.

The processor 370 may provide a first control signal and a second control signal further based on the information regarding the traffic light 1231 and the information regarding the pedestrian 1232.

For example, if it is determined that the pedestrian 1232 is still on a roadway being traveled by the vehicle 100 even when the traffic light 1231 is green, the processor 370 may provide a first control signal and a second control signal based on the determination.

The processor 370 may further acquire the information regarding the traffic light 1231 and information regarding a nearby vehicle 1241. The nearby vehicle 1241 may be a vehicle which interferes the travel of the vehicle 100. For example, the nearby vehicle 1241 may be a vehicle which travels in a direction different from a driving direction of the vehicle 100. For example, the nearby vehicle 1241 may be a vehicle that occupies, for a specific time, at least part of a lane in which the vehicle 100 is expected to travel. For example, the nearby vehicle 1241 may be a vehicle that is likely to collide with the vehicle 100.

The processor 370 may acquire the information regarding the traffic light 1231 and the information regarding the nearby vehicle 1241 via the object detection unit 301.

The processor 370 may acquire the information regarding the traffic light 1231 and the information regarding the nearby vehicle 1241 via a traffic system or the nearby vehicle 1241 via the communication apparatus 400.

The processor 370 may provide a first control signal and a second control signal based on the information regarding the traffic light 1231 and the information regarding the nearby vehicle 1241.

Figure 13:
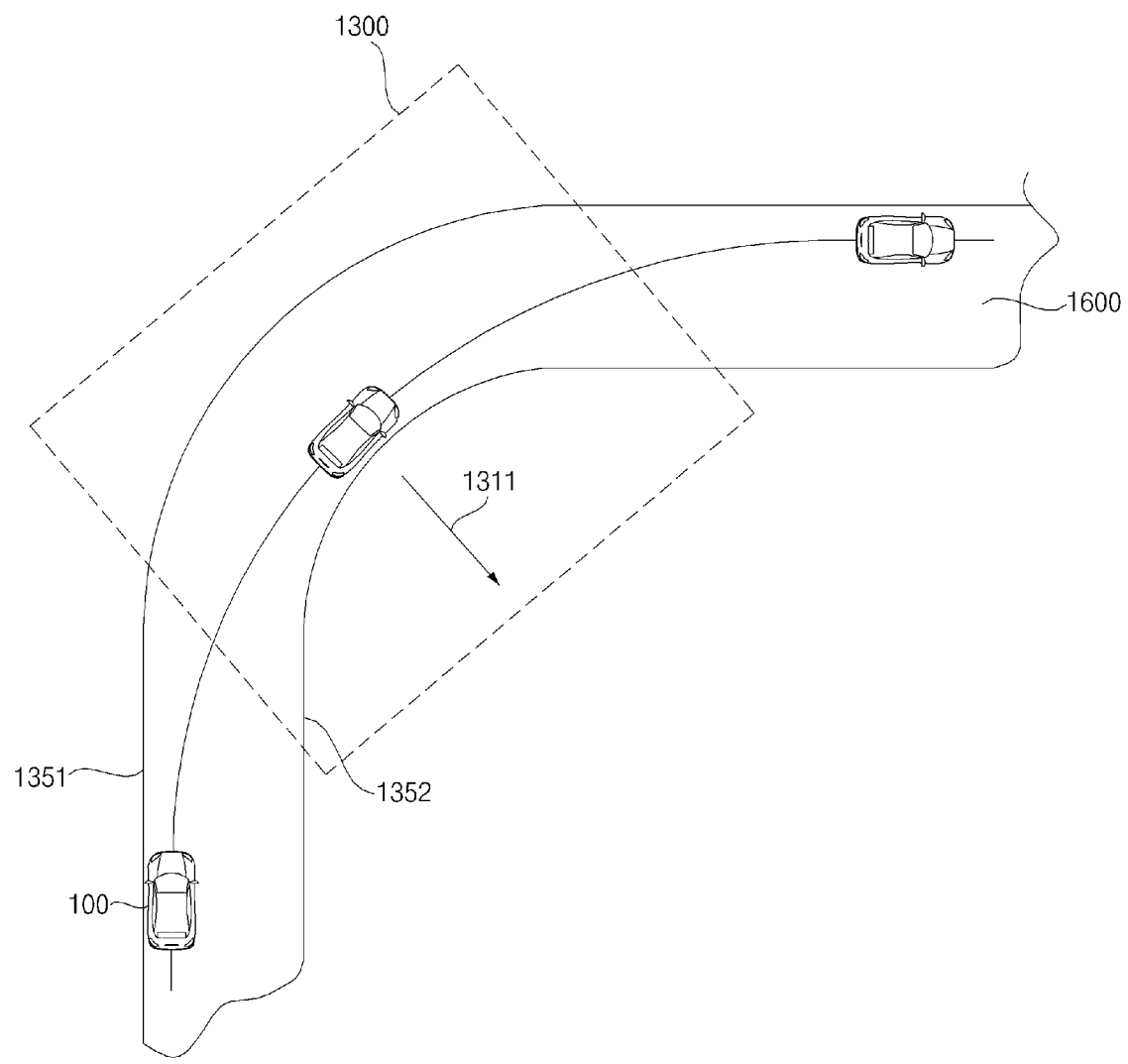
FIGS. 13 to 15 are diagrams illustrating examples of an operation of a vehicle driving control apparatus that provides a control signal based on information regarding a curve, according to an implementation.
Figure 14:
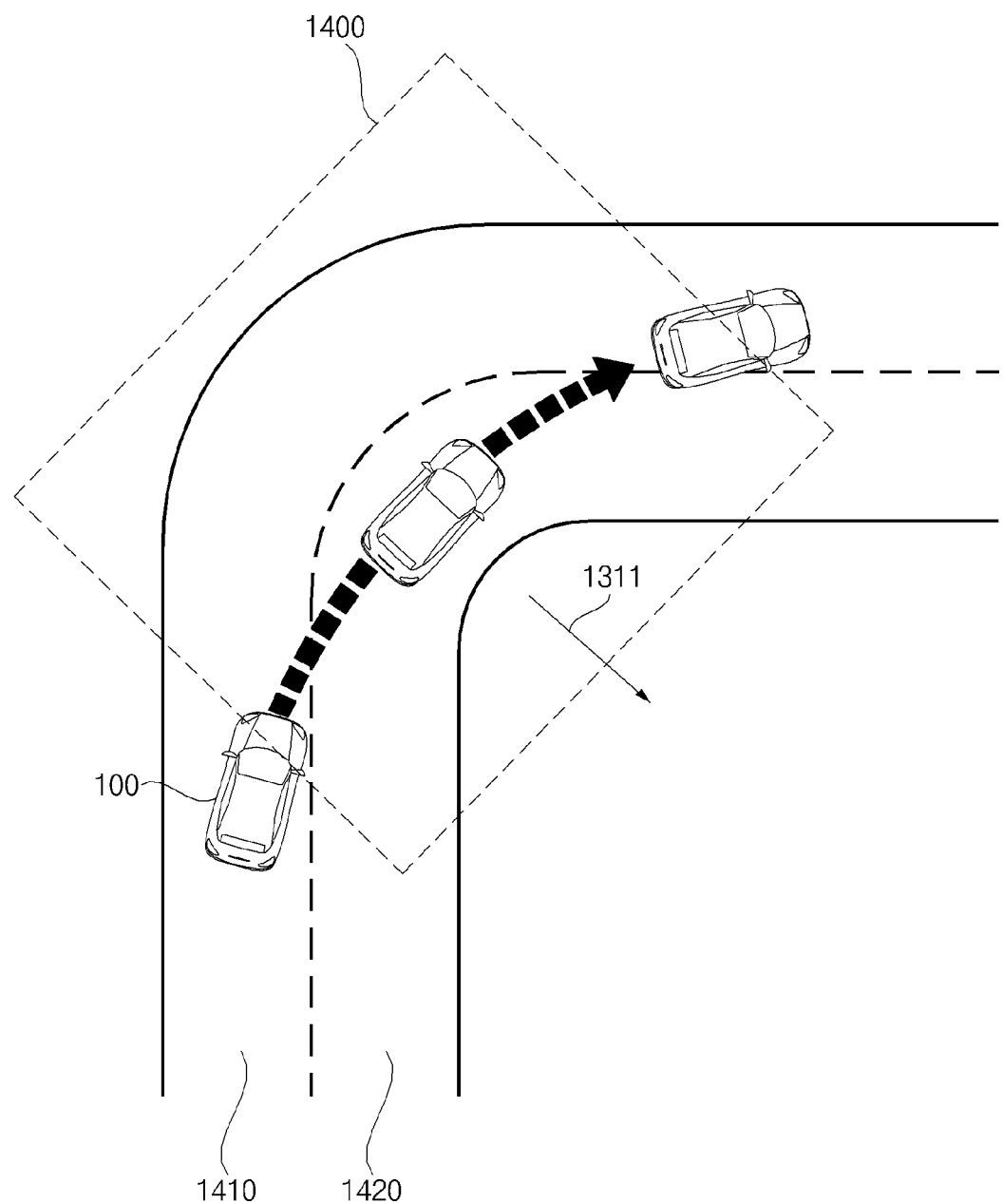
Figure 15:
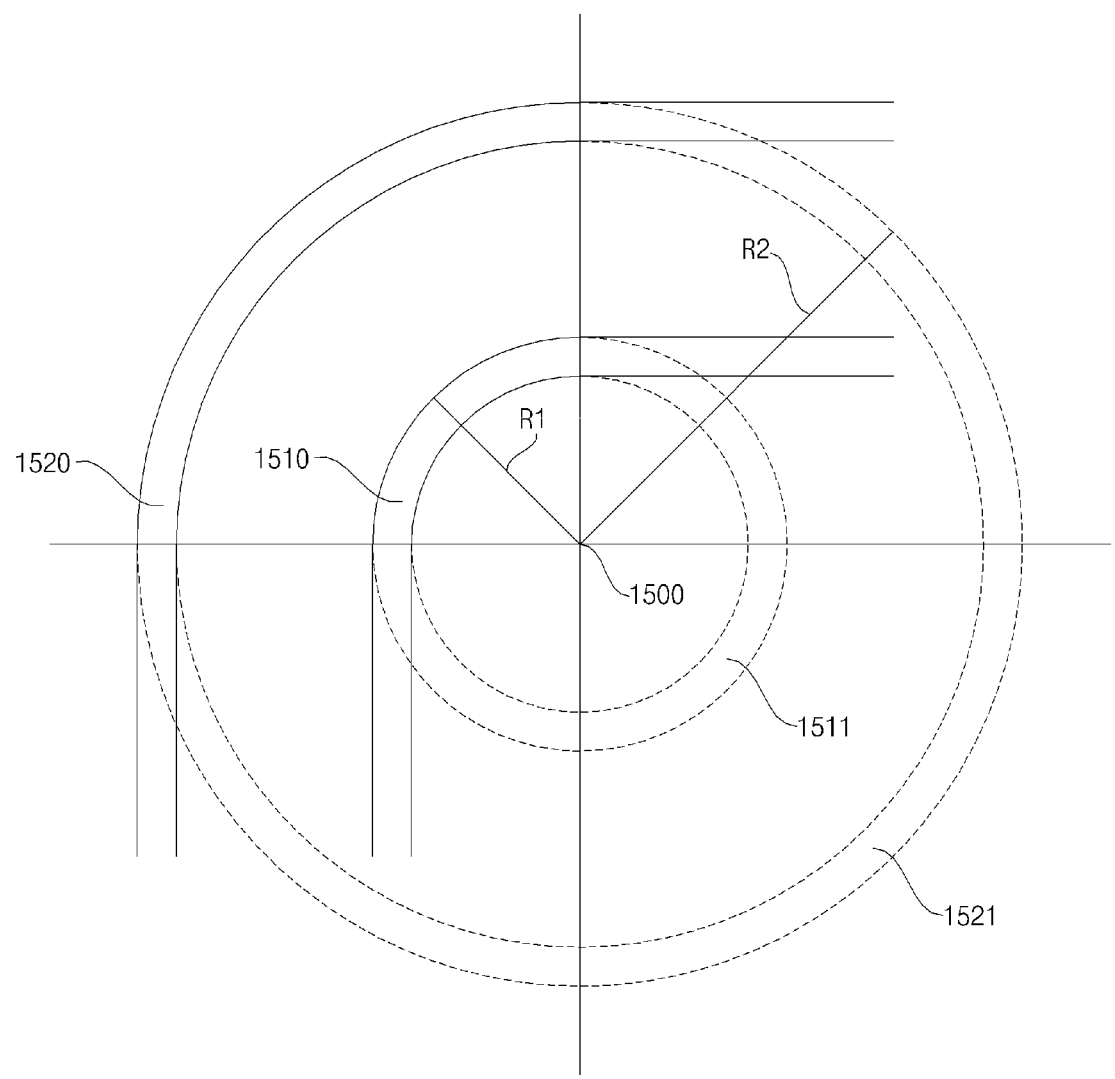

FIGS. 13 to 15 are views referenced to explain operation of a vehicle driving control apparatus that provides a control signal based on information regarding a curve, according to an implementation.

FIG. 13 is a view referenced to explain a vehicle driving control apparatus that provides a control signal based on information regarding a curve when a vehicle keeps travelling in the same lane, according to an implementation.

Referring to FIG. 13, the processor 370 may acquire information regarding a curve 1300 in front of the vehicle 100. Here, the information regarding the curve 1300 may include information as to existence of the curve 1300, information regarding a location of the curve 1300, and information regarding distance between the vehicle 100 and the curve 1300.

The processor 370 may acquire the information regarding the curve 1300 via the object detection unit 301. For example, the processor 370 may acquire the information regarding the curve 1300 by detecting the curve 1300 from a stereo image of an area forward of the vehicle 100, the stereo image which is acquired by a stereo camera.

The processor 370 may acquire the information regarding the curve 1300 via the communication apparatus 400. For example, the processor 370 may acquire the information regarding the curve 1300 from a traffic system via the communication apparatus 400. For example, the processor 370 may acquire the information regarding the curve 1300 from a different vehicle via the communication apparatus 400. The different vehicle may be a preceding vehicle that is travelling ahead of the vehicle 100.

The processor 370 may acquire the information regarding the curve 1300 via the navigation system 770. For example, the processor 370 may acquire the information regarding the curve 1300 based on map information provided by the navigation system 770.

In some implementations, the curve 1300 may be classified as a curve (which is indicated by 1300 in FIG. 13) formed on the right side in the driving direction of the vehicle 100, or as a curve formed on the left side in the driving direction of the vehicle 100.

The processor 370 may provide a first control signal and a second control signal based on the information regarding the curve 1300.

Before the vehicle 100 enters the curve 1300, the processor 370 provide, during a first time period, a first control to reduce a speed of the vehicle 100.

The processor 370 may determine a start point of the first time period based on a distance between the vehicle 100 and the curve 1300.

The processor 370 may determine a degree of speed reduction based on the distance between the vehicle 100 and the curve 1300. The processor 370 may determine a deceleration rate.

The processor 370 may determine a start point of the first time period based on a speed of the vehicle 100 before the first time period.

The processor 370 may determine a degree of speed reduction based on the speed of the vehicle 100 before the first time period. The processor 370 may determine a deceleration rate.

After the vehicle 100 exits the curve 1300, the processor 370 may provide, during a second time period, a second control signal to increase a speed of the vehicle 100.

Curve information may include information regarding a lane expected to be traveled by the vehicle in the curve.

When the vehicle 100 enters the curve 1300, the processor 1300 may provide a steering control signal so that the vehicle 100 travels close to a line of the lane, which is formed in a direction opposite to a curvature direction of the curve 1300.

When the vehicle 100 enters the curve 1300, the processor 370 may provide a steering control signal so that the vehicle 100 travels close to a line 1351 that is formed in a direction opposite to a direction 1311 toward the center of curvature of the curve 1300.

When the vehicle 100 enters the curve 1300, the processor 370 may provide a steering control signal so that the vehicle 100 travels close to the line 1351 that is formed in a direction opposite to a direction in which a curve is formed. For example, a curve is formed toward the right side in the driving direction of vehicle 100, the processor 370 may provide a steering control signal so that the vehicle 100 travels close to a left light of the current driving lane. For example, when a curve is formed toward the left side in the driving direction of vehicle 100, the processor 370 may provide a steering control signal so that the vehicle 100 travels close to the right line of the current travel lane.

The processor 370 may provide a steering control signal a wheel of the vehicle 100 closest to the line 1351 runs within a predetermined distance from the line 1351.

When the vehicle 100 travels in the middle of the curve 1300, the processor 370 may provide a steering control signal so that the vehicle 100 travels close to a line 1352 of the lane, the line 1352 which is formed in a curvature direction 1311 of the curve 1300.

When the vehicle 100 is travelling in the middle of the curve 1300, the processor 370 may provide a steering control signal so that the vehicle 100 travels close to the line 1352 that is in the direction 1311 toward the center of curvature of the curve 1300. The middle of the curve may indicate an arithmetical center between the start point and the end point of the curve.

When the vehicle 100 exits the curve 1300, the processor 370 may provide a steering control signal so that the vehicle 100 travels close to a line of the lane, which is formed in a direction opposite to a curvature direction 1311 of the curve 1300.

When the vehicle 100 exits the curve 1300, the processor 370 may provide a steering control signal so that the vehicle 100 travels close to a line that is formed in a direction opposite to the direction 1311 toward the center of curvature of the curve 100.

In some implementations, the processor 370 may provide a signal to control a suspension based on curve information.

For example, when the vehicle 100 enters the curve 1300, the processor 370 may provide a control signal to lower a suspension disposed at a wheel that is located in a direction opposite to the curvature direction 1311 of the curve 1300. In addition, the processor 370 may provide a control signal to raise a suspension disposed at a wheel that is located in the curvature direction 1311 of the curve 1300.

In this manner, the vehicle may adaptively control driving operations based on the surrounding environment, thus improving ride comfort in some scenarios.

For example, when the vehicle 100 exits the curve 1300, the processor 370 may provide a control signal to raise a suspension disposed at a wheel that is formed in a direction opposite to the curvature direction 1311 of the curve 1300. In addition, the processor 370 may provide a control signal to lower a suspension disposed at a wheel that is formed in the curvature direction 1311 of the curve 1300.

In some implementations, the processor 370 may provide a signal to control a side brake based on curve information.

For example, when the vehicle 100 enters the curve, the processor 370 may provide a control signal so that a wheel located in a direction opposite to the curvature direction 1311 of the curve 1300 is braked less than a wheel located in the curvature direction 1311.

For example, when the vehicle 100 exits the curve 1300, the processor 370 may provide a control signal so that a wheel located in a direction opposite to the curvature direction 1311 of the curve 1300 is braked greater than a wheel located in the curvature direction 1311.

Such side-brake control may be performed, for example, instead of steering control. In this manner, even while cornering, the vehicle 100 is able to remain in a stable position.

In this manner, the vehicle may adaptively control driving operations based on the surrounding environment, thus improving ride safety in some scenarios.

In some implementations, before the vehicle 100 enters the curve, the object detection unit 301 may not be able to detect an object present in the curve 1300 for a predetermined period of time due to a structure or a geographical feature located in the curve 1300.

For example, the camera 310 may not be able to detect an object present in the curve 1300 for a predetermined period of time due to a structure or a geographical feature located in the curve 1300. The processor 370 may control the speed of the vehicle 100 based on Time to Collision (TTC) between an imaginary object and the vehicle 100.

FIG. 14 is a view referenced to explain an operation of a vehicle driving control apparatus that provides a control signal based on information regarding a curve when a vehicle is changing a lane, according to an implementation.

Referring to FIG. 14, the processor 370 may provide a steering control signal based on curve information so that the vehicle 100 changes a lane.

The processor 370 may acquire information regarding a different vehicle travelling in front of the vehicle 100, in the rear of the vehicle 100, or on the side of the vehicle 100.

When the vehicle 100 enters, travels, and exits a curve 1400, the processor 370 may determine whether any other vehicle is travelling in front of the vehicle 100, in the rear of, or on side of the vehicle 100.

When the vehicle 100 enters the curve 1400 without any vehicle travelling nearby, the processor 370 may provide a steering control signal so that the vehicle moves to a next lane that is formed in the curvature direction 1311 of the curve 1400. As illustrated in FIG. 14, before the vehicle 100 enters the curve 1400, the processor 370 may provide a steering control signal so that the vehicle 100 moves to a next lane 1420 that is formed in the curvature direction 1311 of the curve 1400.

When the vehicle 100 exits the curve 1400 without any vehicle travelling nearby, the processor 370 may provide a steering control signal so that the vehicle 100 moves to a next lane that is formed in a direction opposite to the curvature direction of the curve 1400. When the vehicle 100 is travelling in the curve 1400, the processor 370 may provide a steering control signal so that the vehicle 100 moves to a next lane 1410 that is formed in a direction opposite to the curvature direction 1311 of the curve 1400.

FIG. 15 is a view referenced to explain operation of a vehicle control apparatus that provides a control based on information regarding a curve, according to an implementation.

FIG. 15 is a conceptual diagram showing a first curve 1510 and a second curve 1520.

In this example, the first curve 1510 and the second curve 1520 share a central point 1500, although implementations are not limited thereto and the first and second curves may have different central points.

In some implementations, the first curve 1510 may be represented as part of the circumference of a circle 1511 having a first radius R1 from the central point 1500. In this case, the curvature of the first curve 1510 is disproportional to the first radius R1.

The second curve 1520 may be represented as part of the circumference of a circle 1521 having a second radius R2 from the central point 1500. In this case, the curvature of the second curve 1520 is disproportional to the second radius R2.

In this example, the first radius R1 is smaller than the second radius R2, and thus the curvature of the first curve 1510 is greater than the curvature of the second cure section 1520.

In some implementations, the processor 370 may determine a start point of a first time period based on curvature information. For example, the processor 370 may perform control such that the greater curvature a curve has, the earlier the speed of the vehicle starts to be reduced.

As an example, the processor 370 may set the first time period before the first curve 1510 to start at an earlier point than the first time period before the second curve 1520.

The processor 370 may determine a degree of speed reduction based on curvature information. The processor 370 may control the speed of the vehicle to be reduced in disproportion to curvature of a curve.

For example, the processor 370 may reduce a speed of the vehicle 100 about to enter the first curve 1510 by a greater degree than a speed of the vehicle 100 about to enter the second curve 1520.

An understeer or oversteer sensation is more likely to occur due to a centrifugal force when the vehicle 100 travels the curve 1510 having a greater curvature at high speeds, than when the vehicle 100 travels the curve 1520 having a smaller curvature. Therefore, if the vehicle 100 is controlled to reduce the speed an earlier point in time or by a greater degree before entering the curve 1510 having a greater curvature, it is possible to more smoothly travel the curve and lower a probability of an accident.

Figure 16:
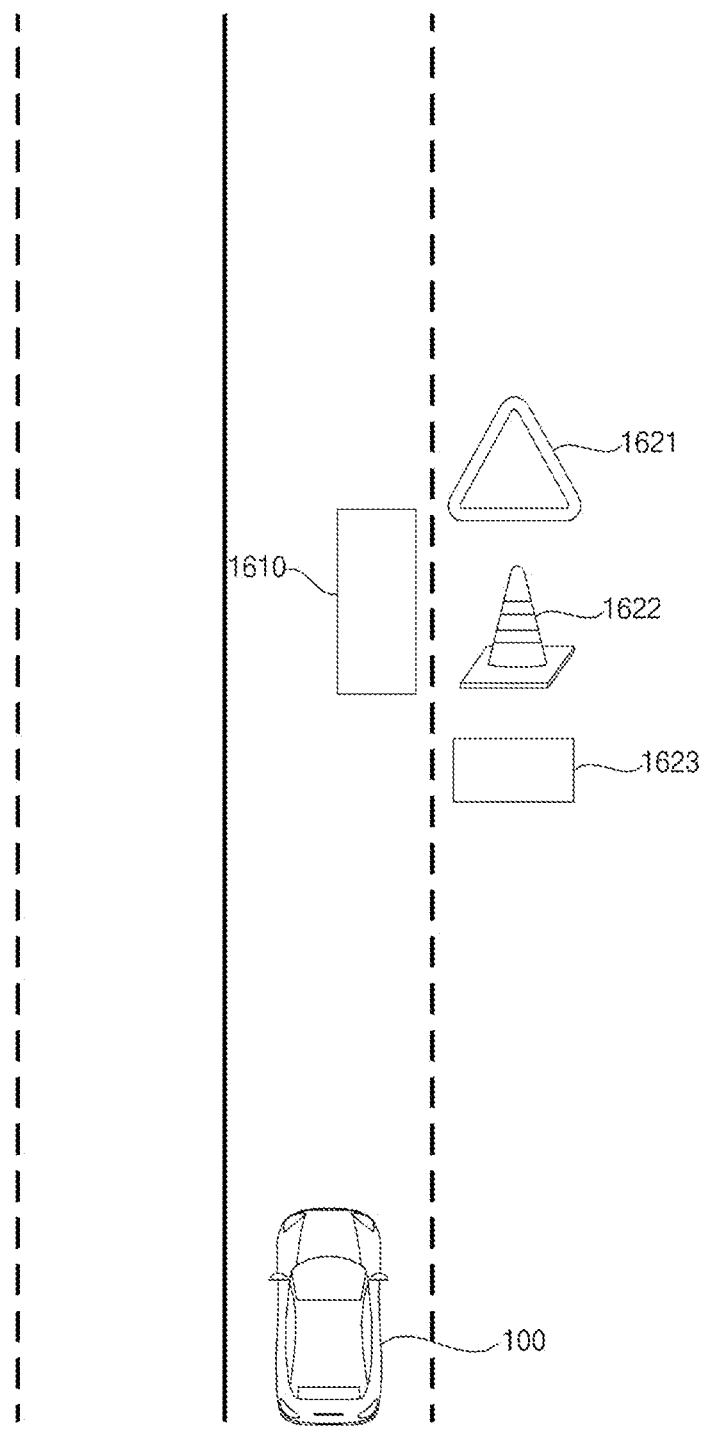
FIG. 16 is a diagram illustrating an example of an operation of a vehicle driving control apparatus that provides a control signal based on information regarding a construction zone, according to an implementation.

FIG. 16 is a view referenced to explain operation of a vehicle control apparatus that provides a control signal based on information regarding a construction zone, according to an implementation.

Referring to FIG. 16, the processor 370 may acquire information regarding a construction zone 1610 in front of the vehicle 100.

The processor 370 may acquire information regarding the construction zone 1610 via the object detection unit 301. For example, the processor 370 may detect the construction zone 1610 from a stereo image of an area forward of the vehicle 100, the stereo image which is acquired by a stereo camera. For example, the processor 370 may detect at least one of a triangle traffic sign 1621, a traffic corn 1622, a construction sign 1623, and a construction vehicle. The processor may acquire information regarding the construction zone 1610 based on the detected data.

The processor 370 may acquire the information regarding the construction zone 1610 via the communication apparatus 400. For example, the processor 370 may acquire the information regarding the construction zone 1610 from a traffic system via the communication apparatus 400. For example, the processor 370 may acquire the information regarding the construction zone 1610 from a different vehicle via the communication apparatus 400. Herein, the different vehicle may be a preceding vehicle which is travelling ahead of the vehicle 100.

The processor 370 may acquire the information regarding the construction zone 1610 via the navigation system 770.

The processor 370 may provide a first control signal and a second control signal based on the information regarding the construction zone 1610.

Before the vehicle 100 enters the construction zone 1610, the processor 370 may provide, during a first time period, a first control signal to reduce a speed of the vehicle 100.

The processor 370 may determine a start point of the first time period based on a distance between the vehicle 100 and the construction zone 1610.

The processor 370 may determine a degree of speed reduction based on the distance between the vehicle 100 and the construction zone 1610. The processor 370 may determine a deceleration rate.

The processor 370 may determine a start point of the first time period based on a speed of the vehicle 100 before the first time period.

The processor 370 may determine a degree of speed reduction based on a speed of the vehicle 100 before the first time period. The processor 370 may determine a deceleration rate.

After the vehicle 100 exits the construction zone 1610, the processor 370 may provide, during a second time period, a second control signal to increase a speed of the vehicle 100.

Figure 17:
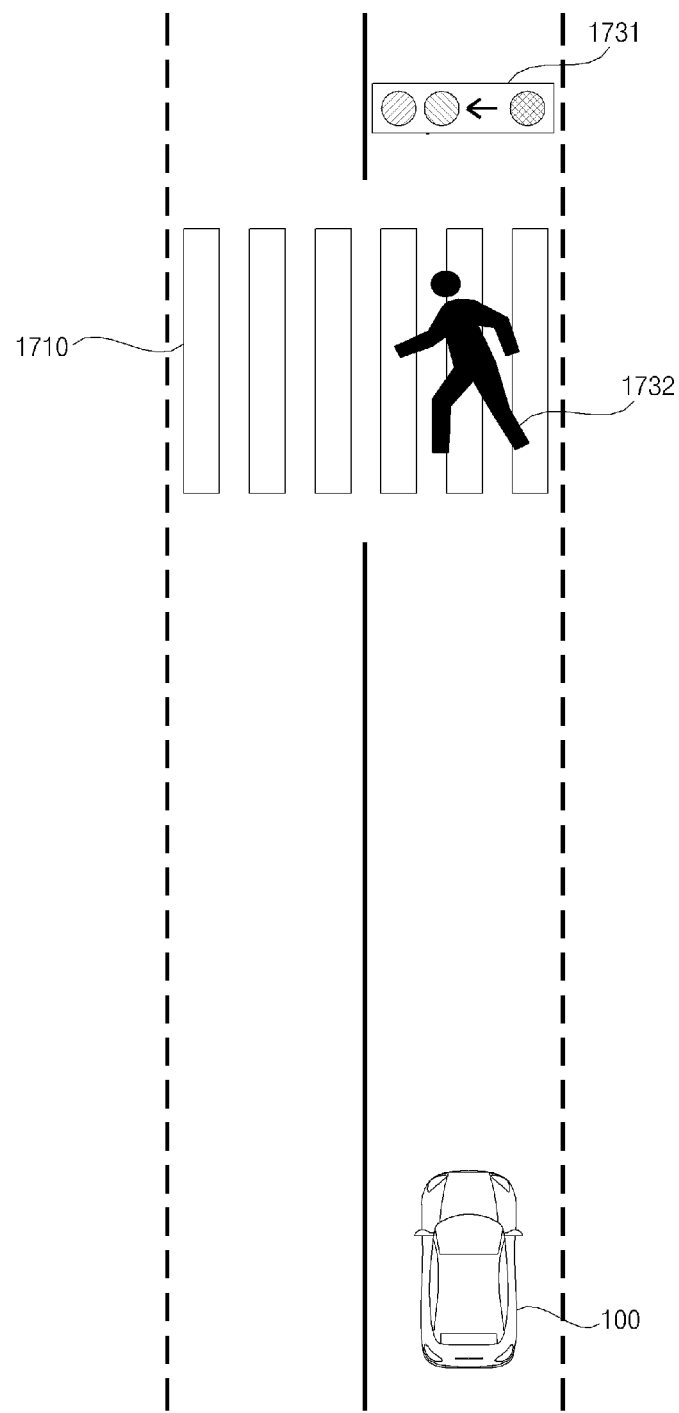
FIG. 17 is a diagram illustrating an example of an operation of a vehicle driving control apparatus that provides a control signal based on information regarding a crosswalk, according to an implementation.

FIG. 17 is a view referenced to explain operation of a vehicle driving control apparatus that provides a control signal based on information regarding a crosswalk, according to an implementation.

Referring to FIG. 17, the processor 370 may acquire information regarding a crosswalk in front of the vehicle 100.

The processor 370 may acquire information regarding a crosswalk 1710 via the object detection unit 301. For example, the processor 370 may acquire the information regarding the crosswalk 1710 by detecting the crosswalk 1710 from a stereo image of an area forward of the vehicle 100, the stereo image which is acquired by a stereo camera.

The processor 370 may acquire the information regarding the crosswalk 1710 via the communication apparatus 400. For example, the processor 370 may acquire the information regarding the crosswalk from a traffic system via the communication apparatus 400. For example, the processor 370 may acquire the information regarding the crosswalk from a different vehicle via the communication apparatus 400. The different vehicle may be a preceding vehicle that is travelling ahead of the vehicle 100.

The processor 370 may acquire the information regarding the crosswalk 1710 via the navigation system 770. For example, the processor 370 may acquire the information regarding the crosswalk based on map information provided by the navigation system 770.

The processor 370 may provide a first control signal and a second control signal based on the information regarding the crosswalk 1710.

Before the vehicle 100 enters the crosswalk 1710, the processor 370 may provide, during a first time period, a first control signal to reduce a speed of the vehicle 100.

The processor 370 may determine a start point of the first time period based on a distance between the vehicle 100 and the crosswalk 1710.

The processor 370 may determine a degree of speed reduction based on the distance between the vehicle 100 and the crosswalk 1710. The processor 370 may determine a deceleration rate.

The processor 370 may determine a start point of the first time period based on a speed of the vehicle 100 before the first time period.

The processor 370 may determine a degree of speed reduction based on the speed of the vehicle 100 before the first time period.

After the vehicle 100 exits the crosswalk 1710, the processor 370 may provide, during a second time period, a second control signal to increase a speed of the vehicle 100.

The processor 370 may further acquire information regarding a traffic light 1731, and information regarding a pedestrian 1732 located in the area around the crosswalk.

The processor 370 may acquire the information regarding the traffic light 1731 and the information regarding the pedestrian 1732 via the object detection unit 301.

The processor 370 may acquire the information regarding the traffic light 1731 and the information regarding the pedestrian 1732 from a traffic system or a different vehicle via the communication apparatus 400.

The processor 370 may provide a first control signal and a second control signal further based on the information regarding the traffic light 1731 and the information regarding the pedestrian 1732.

For example, if it is determined that the pedestrian 1732 is still present in the crosswalk even though the traffic light 1731 is green, the processor 370 may provide a first control signal and a second control signal based on the determination.

Figure 18:
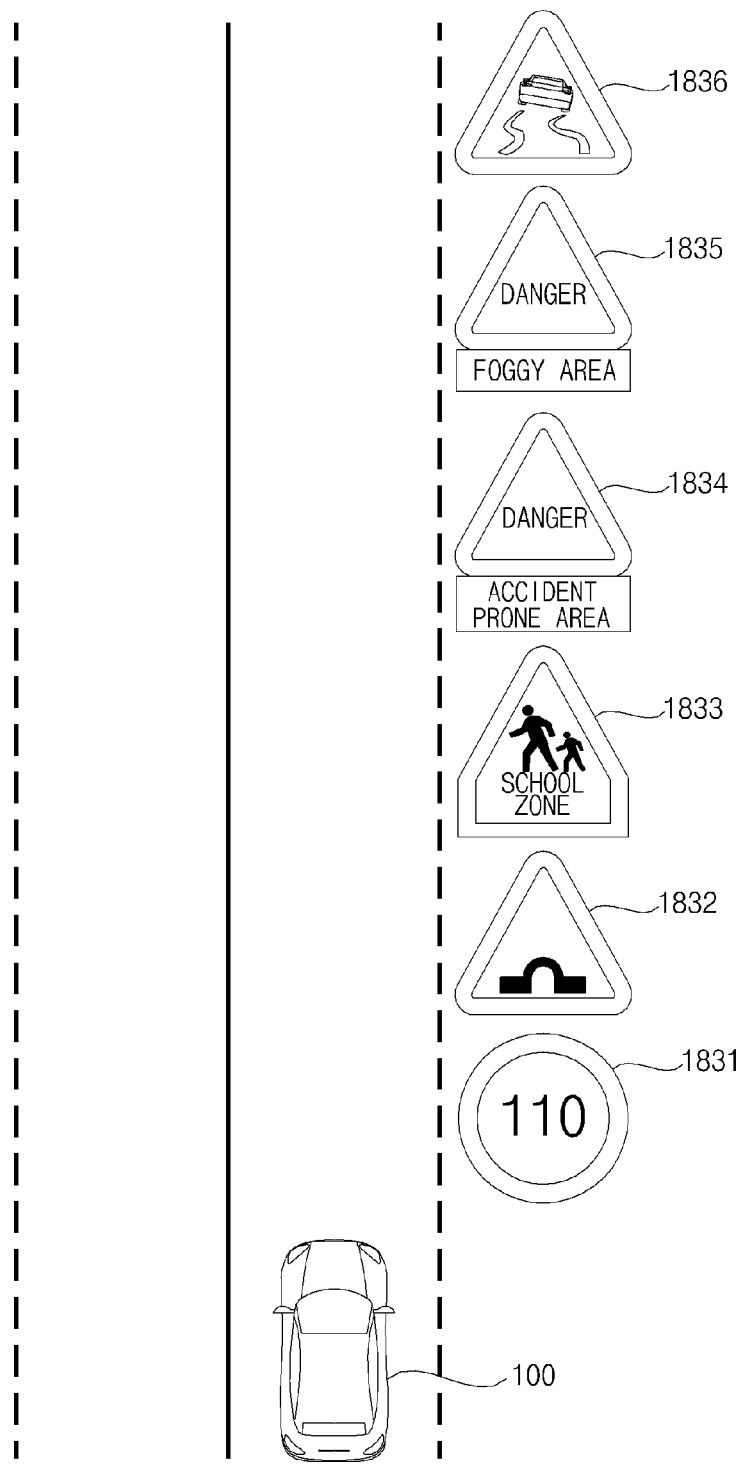
FIG. 18 is a diagram illustrating an example of an operation of a vehicle driving control apparatus that provides a control signal based on traffic sign information, according to an implementation.

FIG. 18 is a view referenced to explain operation of a vehicle driving control apparatus that provides a control signal based on information regarding a traffic sign, according to an implementation.

Referring to FIG. 18, the processor 370 may acquire information regarding a traffic sign. The traffic sign may be at least one of a speed limit sign 1831, a tunnel traffic sign 1832, a school zone sign 1833, an accident prone area sign 1834, a foggy area sign 1835, and a slippery road sign 1836.

The processor 370 may acquire information regarding a traffic sign via the object detection unit 301. For example, the processor 370 may acquire information regarding a traffic signal by detecting a traffic sign from an image of the area forward of the vehicle 100, the stereo image which is acquired by a camera.

The processor 370 may provide a first control signal and a second control signal based on information regarding a traffic sign.

Before the vehicle 100 passes a traffic sign, the processor 370 may provide, during a first time period, a first control signal to reduce a speed of the vehicle 100.

The processor 370 may determine a start point of the first time period based on a distance between the vehicle 100 and the traffic sign.

The processor 370 may determine a degree of speed reduction based on the distance between the vehicle 100 and the traffic sign.

The processor 370 may determine a start point of a first time period based on a speed of the vehicle 100 before the first time period.

The processor 370 may determine a degree of speed reduction based on the speed of the vehicle 100 before the first time period. The processor 370 may determine a deceleration rate.

If the vehicle 100 passes a traffic sign by a predetermined distance, the processor 370 may provide, during a second time period, a second control signal to increase a speed of the vehicle 100.

Figure 19:
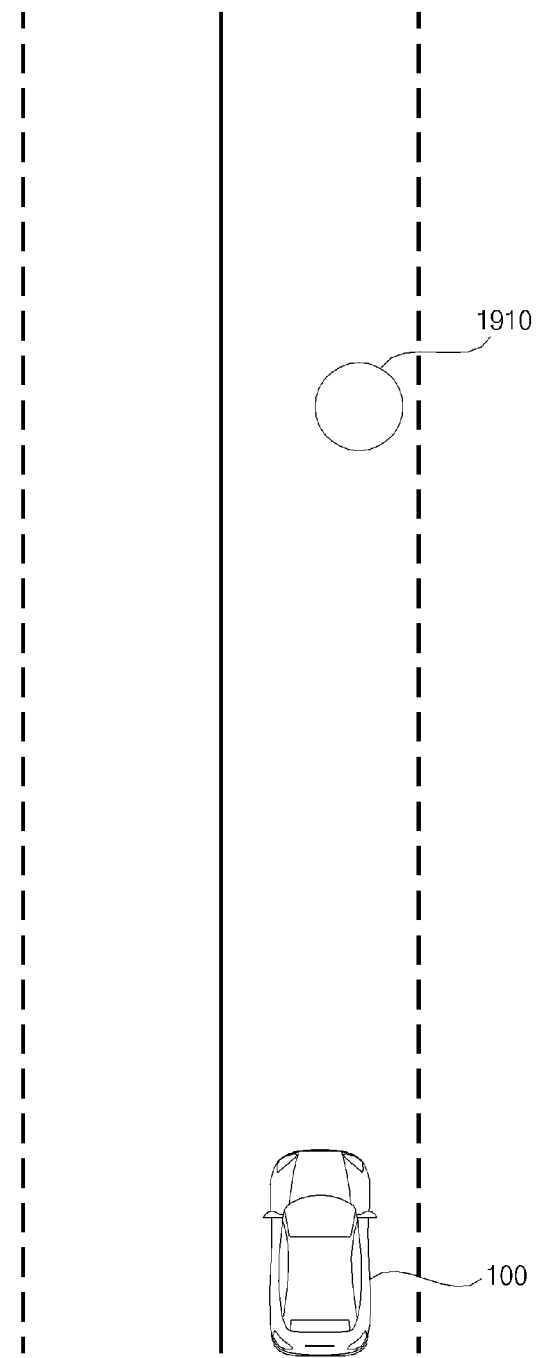
FIG. 19 is a diagram illustrating an example of an operation of a vehicle driving control apparatus that provides a control signal based on information regarding a road surface obstacle, according to an implementation.

FIG. 19 is a view referenced to explain operation of a vehicle driving control apparatus that provides a control signal based on information regarding a road surface obstacle, according to an implementation.

Referring to FIG. 19, the processor 370 may acquire information regarding a road surface obstacle 1910 in front of the vehicle 100. A road surface obstacle may include a pothole, a sinkhole, a puddle, snow, black ice, and a cracked portion of the road surface.

The processor 370 may acquire information regarding the road surface obstacle 1910 via the object detection unit 301. For example, the processor 370 may acquire the information regarding the road surface obstacle 1910 by detecting the road surface obstacle 1910 from a stereo image of an area forward of the vehicle 100, the stereo image which is acquired by a stereo camera.

The processor 370 may acquire the information regarding the road surface obstacle 1910 via the communication apparatus 400. For example, the processor 370 may acquire the information regarding the road surface obstacle 1910 from a traffic system via the communication apparatus 400. For example, the processor 370 may acquire the information regarding the road surface obstacle 1910 from a different vehicle via the communication apparatus 400. The different vehicle may be a preceding vehicle that is travelling ahead of the vehicle 100.

The processor 370 may provide a first control signal and a second control signal based on the information regarding the road surface obstacle 1910.

Before the vehicle 100 passes the road surface obstacle 1910, the processor 370 may provide, during a first time period, a first control signal to reduce a speed of the vehicle 100.

The processor 370 may determine a start point of the first time rage based on a distance between the vehicle 100 and the road surface obstacle 1910.

The processor 370 may determine a degree of speed reduction based on the distance between the vehicle 100 and the road surface obstacle 1910. The processor 370 may determine a deceleration rate.

The processor 370 may determine a start point of the first time period based on a speed of the vehicle 100 before the first time period.

The processor 370 may determine a degree of speed reduction based on the speed of the vehicle 100 before the first time period. The processor 370 may determine a deceleration rate.

After the vehicle 100 passes the road surface obstacle 1910, the processor 370 may provide, during a second time period, a second control signal to increase a speed of the vehicle 100.

Figure 20:
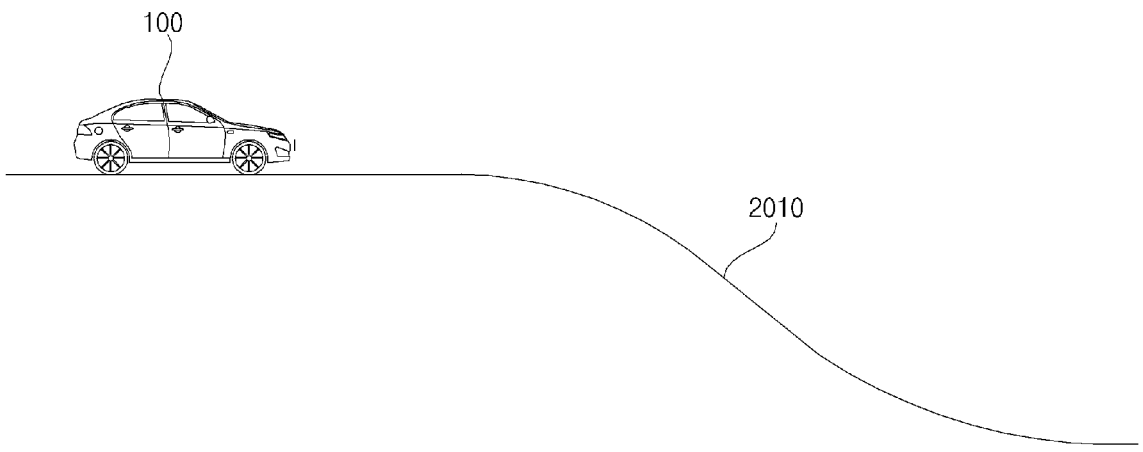
FIGS. 20 and 21 are diagrams illustrating examples of operations of a vehicle driving control apparatus that provides a control signal based on information regarding a slope, according to an implementation.
Figure 21:
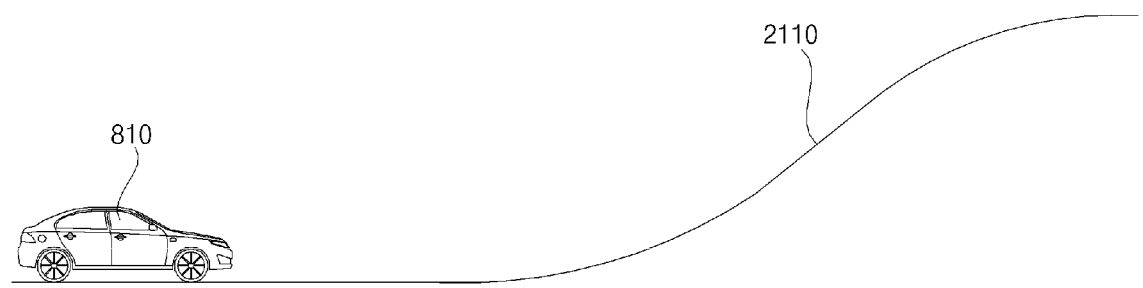

FIGS. 20 and 21 are views referenced to explain operation of a vehicle driving control apparatus that provides a control signal based on information regarding a slope, according to an implementation.

Referring to the drawings, the processor 370 may acquire information regarding slopes 2010 and 2110 in front of the vehicle 100. The information regarding the slopes 2010 and 2110 may include information as to existence of the slopes 2010 and 2011, information regarding locations of the slopes 2010 and 2110, and information regarding distance between the vehicle 100 and the slopes 2010 and 2110.

The processor 370 may acquire the information regarding the slopes 2010 and 2110 via the object detection unit 301. For example, the processor 370 may acquire the information regarding the slopes 2010 and 2110 by detecting the slopes 2010 and 2110 from a stereo image of an area forward of the vehicle 100, the stereo image which is acquired by a stereo camera.

The processor 370 may acquire the information regarding the slopes 2010 and 2110 via the communication apparatus 400. For example, the processor 370 may acquire the information regarding the slopes 2010 and 2110 from a traffic system via the communication apparatus 400. For example, the processor 370 may acquire the information regarding the slopes 2010 and 2110 from a different vehicle via the communication apparatus 400. The different vehicle may be a preceding vehicle that is travelling ahead of the vehicle 100.

The processor 370 may acquire the information regarding the slopes 2010 and 2119 via the navigation system 770. For example, the processor 370 may acquire the information regarding the slopes 2010 and 2110 based on map information provided by the navigation system 770.

In some implementations, the slopes 2010 and 2110 may be divided into a downhill slope 2010 or as an uphill slope 2110.

The processor 370 may provide a first control signal and a second control signal based on the information regarding the slopes 2010 and 2110.

As illustrated in FIG. 20, before the vehicle 100 enters the downhill slope 2010, the processor 370 may provide, during a first time period, a first control signal to reduce a speed of the vehicle 100.

The processor 370 may determine a start point of the first time period based on distance between the vehicle 100 and the downhill slope 2010.

The processor 370 may determine a degree of speed reduction based on the distance between the vehicle 100 and the downhill slope 2010.

The processor 370 may determine a start point of the first time period based on the speed of the vehicle 100 before the first time period.

The processor 370 may determine a degree of speed reduction based on the speed of the vehicle 100 before the first time period. The processor 370 may determine a deceleration rate.

After the vehicle 100 exits the downhill slope 2010, the processor 370 may provide, during a second time period, a second control signal to increase a speed of the vehicle 100.

Before the vehicle 100 enters the downhill sloe 2010, the speed of the vehicle 100 is reduced in advance in consideration of the gravity acting on the vehicle 100 on the downhill slope 2010, and therefore, the vehicle 100 may be able to travel more stably.

As illustrated in FIG. 21, before the vehicle 100 enters the uphill slope 2110, the processor 370 may provide, during a first time period, a first control signal to increase a speed of the vehicle 100.

The processor 370 may determine a start point of the first time period based on a distance between the vehicle 100 and an uphill slope 2110.

The processor 370 may determine a degree of speed reduction based on the distance between the vehicle 100 and the uphill slope 2110. The processor 370 may determine a deceleration rate.

The processor 370 may determine a start point of the first time period based on a speed of the vehicle 100 before the first time period.

The processor 370 may determine a degree of speed reduction based on the speed of the vehicle 100 before the first time period. The processor 370 may determine a deceleration rate.

After the vehicle 100 exits the uphill slope 2110, the processor 370 may provide, during a second time period, a second control signal to increase a speed of the vehicle 100.

Before the vehicle 100 enters the uphill slope 2110, the speed of the vehicle 100 is increased in advance in consideration of the gravity force acting on the vehicle 100 on the uphill slope 2110, and therefore, the vehicle 100 may be able to travel more stably.

Figure 22:
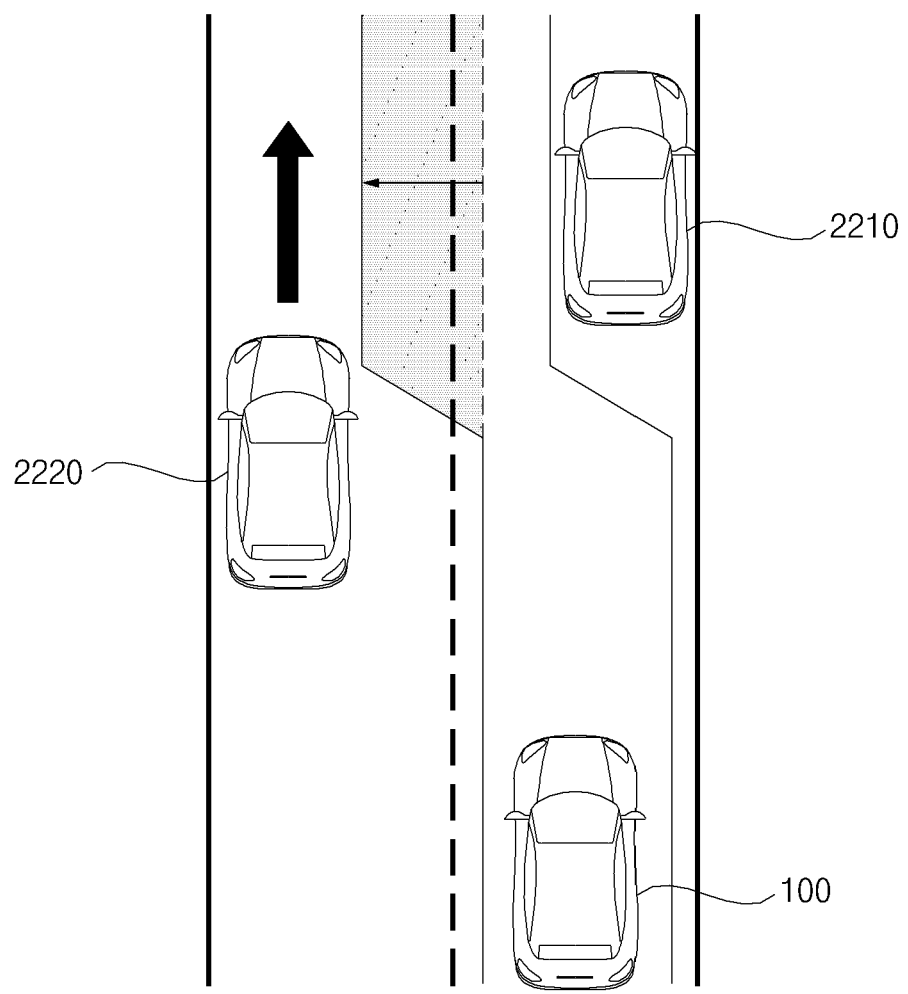
FIG. 22 is a diagram illustrating an example of an operation of a vehicle driving control apparatus that provides a control signal based on object information so that a vehicle moves to the left or right side, according to an implementation.

FIG. 22 is a view referenced to explain a vehicle driving control apparatus that provides a control signal so that a vehicle moves to the left or right side based on information regarding an object, according to an implementation.

Referring to FIG. 22, the processor 370 may include information regarding objects 2210 and 2220. The objects 2210 and 2220 may include nearby vehicles 2210 and 2220 located in vicinity of the vehicle 100.

The processor 370 may acquire information regarding a nearby vehicle 2210 that is stopped in front of the vehicle 100 in a lane in which the vehicle 100 is travelling.

Before the vehicle 100 passes the nearby vehicle 2210, the processor 370 may provide, during a first time period, a first control signal based on information regarding the nearby vehicle 2210 so that the vehicle 100 moves to the left side in a driving direction thereof.

For example, the processor 370 may provide a first control signal which is a steering control signal so that the vehicle 100 moves to the left side in a driving direction thereof.

For example, the processor 370 may provide a first control signal so that a braking force applied to the left wheels of the vehicle 100 is greater than a braking force applied to the right wheels of the vehicle 100.

After the vehicle 100 passes the nearby vehicle 2210, the processor 370 may provide a second control signal so that the vehicle 100 moves to the right side in a driving direction thereof.

For example, the processor 370 may provide a second control signal which is a steering control signal so that the vehicle 100 moves to the right side in a driving direction thereof.

For example, the processor 370 may provide a second control signal so that a braking force applied to the right wheels of the vehicle 100 becomes greater than a braking force applied to the left wheels of the vehicle 100.

Figure 23:
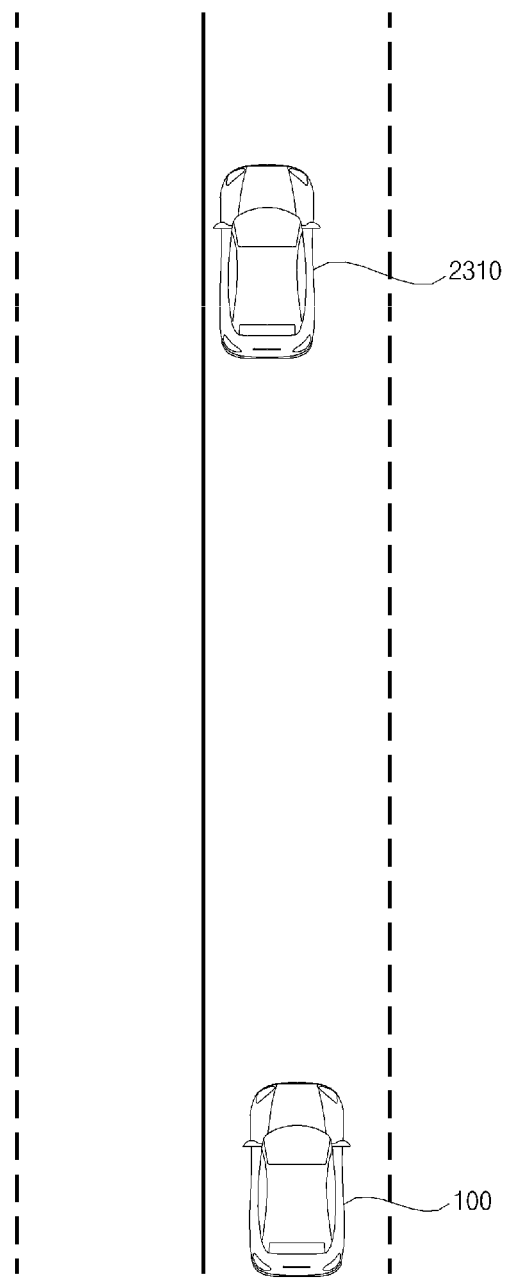
FIG. 23 is a diagram illustrating an example of an operation of a vehicle driving control apparatus that provides a control signal based on information regarding a nearby vehicle according to an implementation.

FIG. 23 is a view referenced to explain operation of a vehicle driving control apparatus that provides a control signal based on information regarding a nearby vehicle, according to an implementation.

Referring to FIG. 23, the processor 370 may acquire information regarding a nearby vehicle 2310 in the vicinity of the vehicle 100. The nearby vehicle 2310 may be located in front of the vehicle 100, in the rear of the vehicle 100, or on the side of the vehicle 100.

The processor 370 may acquire movement information of the nearby vehicle 2310.

The processor 370 may acquire movement information of the nearby vehicle 2310 via the object detection unit 301.

The object detection unit 301 may detect the nearby vehicle 2310, and generate movement information of the nearby vehicle 2310 by constantly tracking the nearby vehicle 2310.

The processor 370 may generate movement information of the nearby vehicle 2310 based on a movement vector of the nearby vehicle 2310, the vector which is acquired by the object detection unit 301.

The processor 370 may provide a first control signal and a second control signal based on movement information of the nearby vehicle 2310.

Before the vehicle 100 passes the nearby vehicle 2310, the processor 370 may provide, during a first time period, a first control signal based on movement information of the nearby vehicle 2310 so that a speed of the vehicle 100 is reduced in order to avoid collision with the nearby vehicle 2310.

After the vehicle 100 passes the nearby vehicle 2310, the processor 370 may provide, during a second time period, a second control signal to increase a speed of the vehicle 100.

Before the vehicle 100 passes the nearby vehicle 2310, the processor 370 may provide, during a first time period, a first control signal based on movement information of the nearby vehicle 2310 so that the vehicle 100 moves to the left side in a driving direction thereof in order to avoid collision with the nearby vehicle 2310.

After the vehicle 100 passes the nearby vehicle 2310, the processor 370 may provide, during a second time period, a second control signal so that the vehicle 100 moves to the right side in the driving direction of the vehicle 100.

Before the vehicle 100 passes the nearby vehicle 2310, the processor 370 may provide, during a first time period, a first control signal based on movement information of the nearby vehicle 2310 so that the vehicle 100 moves to the right side in a driving direction thereof.

After the vehicle 100 passes the nearby vehicle 2310, the processor 370 may provide, during a second time period, a second control signal so that the vehicle 100 moves to the left side in the driving direction of the vehicle 100.

Figure 24:
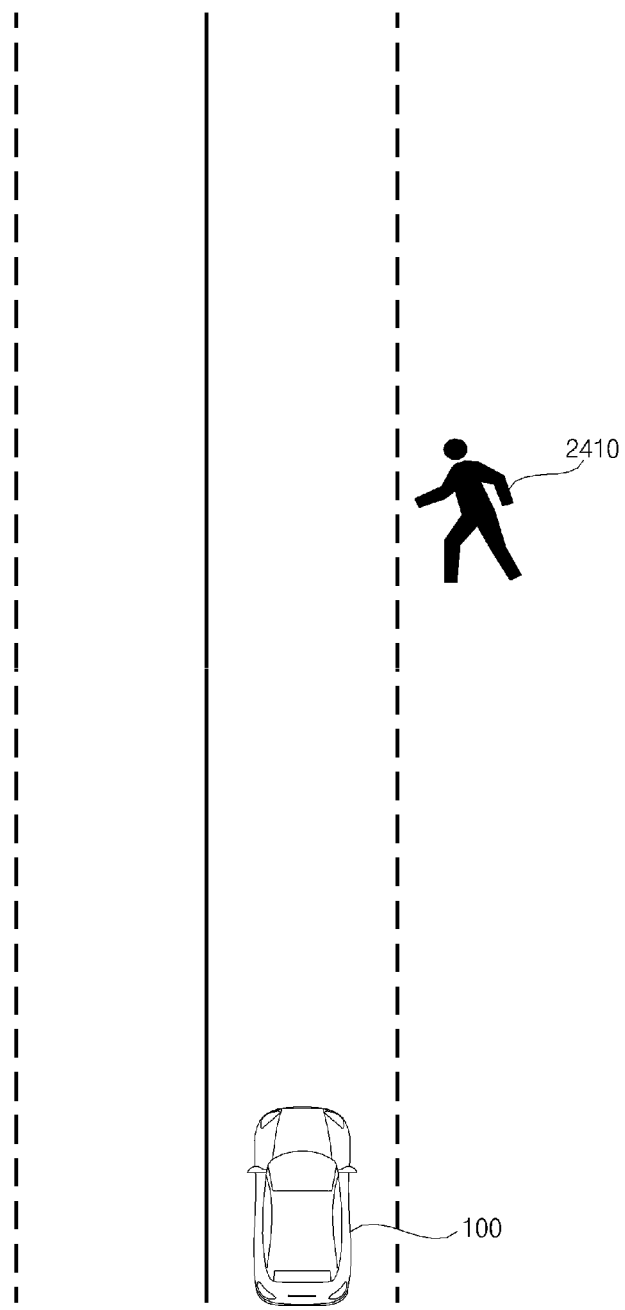
FIG. 24 is a diagram illustrating an example of an operation of a vehicle driving control apparatus that provides a control signal based on pedestrian information according to an implementation.

FIG. 24 is a view referenced to explain operation of a vehicle driving control apparatus that provides a control signal based on information regarding a pedestrian, according to an implementation.

Referring to FIG. 24, the processor 370 may acquire information regarding a pedestrian 2410 in the vicinity of the vehicle 100. The pedestrian 2410 may be located in front of the vehicle 100, in the rear of the vehicle 100, or on the side of the vehicle 100.

The processor 370 may acquire movement information of the pedestrian 2410.

The processor 370 may acquire movement information of the pedestrian 2410 via the object detection unit 301. The object detection unit 301 may detect the pedestrian 2410 and generate the movement information of the pedestrian 2410 by constantly tracking the pedestrian 2410.

The processor 370 may generate the movement information of the pedestrian 2410 based on a movement vector of the pedestrian 2410, which is acquired by the object detection unit 301.

The processor 370 may provide a first control signal and a second control signal based on the movement information of the pedestrian 2410.

Before the vehicle 100 passes the pedestrian 2410, the processor 370 may provide, during a first time period, a first control signal based on the movement information of the pedestrian to reduce a speed of the vehicle 100 in order to avoid collision with the pedestrian 2410.

After the vehicle 100 passes the pedestrian 2410, the processor 370 may provide, during a second time period, a second control signal to increase a speed of the vehicle 100.

Before the vehicle 100 passes the pedestrian 2410, the processor 370 may provide, during a first time period, a first control signal based on the movement information of the pedestrian 2410 so that the vehicle 100 moves to the left side in the driving direction of the vehicle 100 in order to avoid collision with the pedestrian 2410.

After the vehicle 100 passes the pedestrian 2410, the processor 370 may provide, during a second time period, a second control signal so that the vehicle 100 moves to the right side in a driving direction thereof.

Before the vehicle 100 passes the pedestrian 2410, the processor 370 may provide, during a first time period, a first control signal based on the movement information of the pedestrian 2410 so that the vehicle 100 moves to the right side in the driving direction of the vehicle 100 in order to avoid collision with the pedestrian 2410.

After the vehicle 100 passes the pedestrian 2410, the processor 370 may provide, during a second time period, a second control signal so that the vehicle 100 moves to the left side in a driving direction thereof.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A vehicle driving control apparatus comprising:
    at least one processor configured to receive information regarding an object located outside a vehicle detected by an object detection unit of the vehicle driving control apparatus, and provide a first control signal and a second control signal based on the received information,
    wherein the at least one processor provides the first control signal and the second control signal by:

based on the information regarding the object, providing the first control signal to cause one of an increase or a decrease in a speed of the vehicle, and/or one of a right steering or a left steering of the vehicle during a first time period; and based on the information regarding the object and based on the first control signal provided during the first time period, providing the second control signal to cause the other of the increase or the decrease in the speed of the vehicle, and/or the other of the right steering or the left steering of the vehicle during a second time period, and wherein the at least one processor determines the timing of the first time period and the second time period during which the first control signal and the second control signals are to be applied, wherein the at least one processor determines both the first and second control signals and the timing of the first and second time periods prior to providing either of the first or second control signals, wherein the second time period is separated from the first time period, wherein the first control signal and the second control signal are executed during the first time period and the second time period, respectively, wherein the speed or a lateral position of the vehicle after the second time period is the same as the speed or the lateral position of the vehicle before the first time period, and wherein the at least one processor is further configured to:
set, based on a distance between the vehicle and the object located outside the vehicle and/or a speed at which the vehicle traveled before the first time period, the first time period by determining a location corresponding to a start time of the first time period; and
provide a third control signal to maintain the speed of the vehicle and/or the lateral position of the vehicle during a third time period, the third time period being between the first time period and the second time period.

2. The vehicle driving control apparatus according to claim 1, wherein the at least one processor is further configured to provide the first control signal and the second control signal based on the vehicle being in a state of following a preceding vehicle.

3. The vehicle driving control apparatus according to claim 1, wherein the at least one processor is further configured to:
acquire information regarding a roadway on which the vehicle is travelling; and
provide the first control signal and the second control signal based on the information regarding the roadway on which the vehicle is travelling.

4. The vehicle driving control apparatus according to claim 3, wherein the at least one processor is further configured to:
acquire information regarding an intersection ahead of the vehicle;
before the vehicle enters the intersection, provide the first control signal during the first time period to reduce a speed of the vehicle; and
after the vehicle exits the intersection, provide the second control signal to increase the speed of the vehicle.

5. The vehicle driving control apparatus according to claim 4, wherein the at least one processor is further configured to:

acquire information regarding a traffic light and information regarding a pedestrian in an area around the intersection; and
provide the first control signal and the second control signal based on a determination that the pedestrian is present on the roadway on which the vehicle is travelling in a state in which the traffic light is green.

6. The vehicle driving control apparatus according to claim 3, wherein the at least one processor is further configured to:
acquire information regarding a curve ahead of the vehicle;
before the vehicle enters the curve, provide the first control signal during the first time period to reduce a speed of the vehicle; and
after the vehicle exits the curve, provide the second control signal during the second time period to increase a speed of the vehicle.

7. The vehicle driving control apparatus according to claim 6, wherein the at least one processor is further configured to:
acquire information regarding a lane of the curve in which the vehicle is expected to travel; and
based on the vehicle entering the curve, provide a steering control signal that controls the vehicle to travel closer to a lane-marker of the lane that is formed on a side of the lane that is farther from a curvature direction of the curve.

8. The vehicle driving control apparatus according to claim 6, wherein the at least one processor is further configured to:
acquire information regarding a lane of the curve in which the vehicle is expected to travel; and
based on the vehicle travelling in a middle of the curve, provide a steering control signal that controls the vehicle to travel closer to a lane-marker of the lane that is formed on a side of the lane that is closer to a curvature direction of the curve.

9. The vehicle driving control apparatus according to claim 6, wherein the at least one processor is further configured to:
based on the vehicle entering the curve, provide a steering control signal that controls the vehicle to move to a lane that is closer to a curvature direction of the curve.

10. The vehicle driving control apparatus according to claim 6, wherein the at least one processor is further configured to:
based on the vehicle exiting the curve, provide a steering control signal that controls the vehicle to move to a lane that is farther from a curvature direction of the curve.

11. The vehicle driving control apparatus according to claim 6, wherein the at least one processor is further configured to:
acquire curvature information of the curve; and
determine a start point of the first time period based on the curvature information.

12. The vehicle driving control apparatus according to claim 11, wherein the at least one processor is further configured to determine a degree of speed reduction for the vehicle based on the curvature information.

13. The vehicle driving control apparatus according to claim 3, wherein the at least one processor is further configured to:
acquire information regarding a construction zone ahead of the vehicle;

before the vehicle enters the construction zone, provide the first control signal during the first time period to reduce a speed of the vehicle; and after the vehicle exits the construction zone, provide the second control signal during the second time period to increase the speed of the vehicle.

14. The vehicle driving control apparatus according to claim 3, wherein the at least one processor is further configured to:

acquire information regarding a crosswalk ahead of the vehicle;

before the vehicle enters the crosswalk, provide the first control signal during the first time period to reduce a speed of the vehicle, and after the vehicle exits the crosswalk, provide the second control signal during the second time period to increase the speed of the vehicle.

15. The vehicle driving control apparatus according to claim 14, wherein the at least one processor is further configured to:

acquire information regarding a traffic light and information regarding a pedestrian in an area around the crosswalk; and provide the first control signal and the second control signal based on a determination that the pedestrian is present in the crosswalk in a state in which the traffic light is green.

16. The vehicle driving control apparatus according to claim 3, wherein the at least one processor is further configured to:

acquire traffic sign information that indicates at least one of speed limit information, tunnel information, accident prone area information, foggy area information, school zone information, or slippery road information; and provide the first control signal and the second control signal further based on the traffic sign information.

17. The vehicle driving control apparatus according to claim 3, wherein the at least one processor is further configured to:

acquire information regarding a road surface obstacle located on a roadway being traveled by the vehicle;

in a state in which the vehicle approaches the road surface obstacle within a first distance, provide the first control signal during the first time period to reduce a speed of the vehicle; and in a state in which the vehicle moves away from the road surface obstacle within a second distance, provide the second control signal during the second time period to increase the speed of the vehicle.

18. The vehicle driving control apparatus according to claim 3, wherein the at least one processor is further configured to:

acquire information regarding a downhill slope ahead of the vehicle;

before the vehicle enters the downhill slope, provide the first control signal during the first time period to reduce a speed of the vehicle; and after the vehicle exits the downhill slope, provide the second control signal during the second time period to increase the speed of the vehicle.

19. The vehicle driving control apparatus according to claim 3, wherein the at least one processor is further configured to:

acquire information regarding an uphill slope ahead of the vehicle;

before the vehicle enters the uphill slope, provide the first control signal during the first time period to increase a speed of the vehicle; and after the vehicle exits the uphill slope, provide the second control signal during the second time period to reduce a speed of the vehicle.

20. The vehicle driving control apparatus according to claim 1, wherein the at least one processor is further configured to:

set, based on a distance between the vehicle and the object located outside the vehicle and a speed at which the vehicle traveled before the first time period, the first time period by determining a location corresponding to a start time of the first time period; and provide a third control signal to maintain the speed of the vehicle and the lateral position of the vehicle during a third time period, the third time period being between the first time period and the second time period.

* * * * *